US011150658B2

(12) United States Patent
Ouyang et al.

(10) Patent No.: US 11,150,658 B2
(45) Date of Patent: Oct. 19, 2021

(54) HYBRID AERIAL/UNDERWATER ROBOTICS SYSTEM FOR SCALABLE AND ADAPTABLE MAINTENANCE OF AQUACULTURE FISH FARMS

(71) Applicant: FLORIDA ATLANTIC UNIVERSITY BOARD OF TRUSTEES, Boca Raton, FL (US)

(72) Inventors: Bing Ouyang, Vero Beach, FL (US); Paul Wills, Vero Beach, FL (US); Jason Hallstrom, Boca Raton, FL (US); Tsung-Chow Su, Boca Raton, FL (US); Martin Riche, Fort Pierce, FL (US); Peter Reiff, Murphysboro, IL (US); Yufei Tang, Boca Raton, FL (US)

(73) Assignee: Florida Atlantic University Board of Trustees, Boca Raton, FL (US)

( * ) Notice: Subject to any disclaimer, the term of this patent is extended or adjusted under 35 U.S.C. 154(b) by 43 days.

(21) Appl. No.: 16/811,669

(22) Filed: Mar. 6, 2020

(65) Prior Publication Data
US 2021/0064034 A1    Mar. 4, 2021

Related U.S. Application Data

(60) Provisional application No. 62/843,907, filed on May 6, 2019.

(51) Int. Cl.
G05D 1/00      (2006.01)
G05B 19/4155   (2006.01)
(Continued)

(52) U.S. Cl.
CPC ........... *G05D 1/0088* (2013.01); *A01K 61/13* (2017.01); *B25J 19/02* (2013.01); *B60F 5/003* (2013.01);
(Continued)

(58) Field of Classification Search
CPC .. G05D 1/0088; G05D 1/1062; G05D 1/0692; G05D 1/102; G05B 19/4155;
(Continued)

(56) References Cited

U.S. PATENT DOCUMENTS

| 2017/0086430 | A1  | 3/2017 | Wills et al. |
| 2019/0004484 | A1* | 1/2019 | Cussonneau ........... G06N 20/00 |
| 2021/0164954 | A1* | 6/2021 | Lewis .................... G01N 33/18 |

OTHER PUBLICATIONS

S. Bhandari, A. Raheja, R. L. Green and D. Do, "Towards collaboration between unmanned aerial and ground vehicles for precision agriculture," in Proc. SPIE 10218 Autonomous Air and Ground Sensing Systems for Agricultural Optimization and Phenotyping II, Orlando, Florida, 2017.

(Continued)

*Primary Examiner* — Thomas Ingram
(74) *Attorney, Agent, or Firm* — Fox Rothschild LLP

(57) ABSTRACT

Systems and methods for operating a HAUCS sensing platform. The methods comprise: autonomous travel by a UAAV to a first location in proximity to a body of water ("BoW") in accordance with a mission plan; actuating a mechanical device to transition a sensor from a retracted position in which the sensor is adjacent to a UAAV to an extended position in which the sensor resides a given distance from a UAAV; collect, by HAUCS sensing platform and sensor, sensor data concerning a water condition of BoW at different depths; actuating the mechanical device to transition the sensor from the extended position to the retracted position after the sensor data has been collected; causing the sensor data to be processed using a machine learning-based analytical engine to determine whether a water distress condition exists/is predicted to occur; and modifying the mission plan when the water distress condition exists/is predicted to occur.

34 Claims, 18 Drawing Sheets

(51) Int. Cl.
| | |
|---|---|
| B25J 19/02 | (2006.01) |
| G05D 1/10 | (2006.01) |
| G05D 1/06 | (2006.01) |
| B63B 79/40 | (2020.01) |
| B63B 79/15 | (2020.01) |
| B63G 8/14 | (2006.01) |
| B63G 8/00 | (2006.01) |
| B60L 53/30 | (2019.01) |
| B64C 37/00 | (2006.01) |
| B60F 5/00 | (2006.01) |
| A01K 61/13 | (2017.01) |

(52) U.S. Cl.
CPC ............ *B60L 53/30* (2019.02); *B63B 79/15* (2020.01); *B63B 79/40* (2020.01); *B63G 8/001* (2013.01); *B63G 8/14* (2013.01); *B64C 37/00* (2013.01); *G05B 19/4155* (2013.01); *G05D 1/0692* (2013.01); *G05D 1/1062* (2019.05); *B63G 2008/004* (2013.01); *G05B 2219/40276* (2013.01)

(58) Field of Classification Search
CPC ....... G05B 13/0265; G05B 2219/40276; B25J 19/02; B63B 79/40; B63B 79/15; B63G 8/14; B63G 8/001; B63G 2008/004; B60L 53/30; B64C 37/00; B60F 5/003; A01K 61/13
See application file for complete search history.

(56) References Cited

OTHER PUBLICATIONS

F. Cheein, D. Herrera, J. Gimenez, R. Carelli, M. Torres-Torriti, J. R. Rosell-Polo, A. Escola and J. Amo, "Human-robot nteraction in precision agriculture: Sharing the workspace with service units," in IEEE International Conference on ndustrial Technology (/CIT), Seville, Spain, 2015.

D. Schimmelpfennig, "Precision Agriculture Technologies and Factors Affecting Their Adoption," 5 12 2016. [Online], Available: https://www.ers.usda.gov/amber-waves/2016/december/precision-agriculture-technologies-and-factors-affecting-their-adoption/. [Accessed 1 2 2018],.

P. Tokekar, J. V. Hook, D. Mulla and V. Isler, "Sensor Planning for a Symbiotic UAV and UGV System for Precision Agriculture," IEEE Transactions on Robotics>, vol. 32, No. 6, pp. 1498-1511,2016.

K. R. Aravind, P. Raja and M. Perez-Ruiz, "Task-based agricultural mobile robots in arable farming: A review," Spanish Journal of Agricultural Research, vol. 15, No. 1, p. p. e02R01, 2017.

D. Portugal and R. Rocha, "MSP Algorithm: Multi-Robot Patrolling based on Territory Allocation using Balanced Graph Partitioning," in Proc, of Symposium on Applied Computing (SAC 2010), Sierre, Switzerland, 2010.

N. Michael, E. Stump and K. Mohta, "Persistent surveillance with a team of MAVs," in 2011 IEEEIRSJ International Conference on Intelligent Robots and Systems (/ROS), San Francisco, 2011.

N. Nigam and I. Kroo, "Persistent Surveillance Using Multiple Unmanned Air Vehicle," in 2008 IEEE Aerospace Conference, Big Sk, 2008.

D. Mitchell, N. Chakraborty, K. Sycara and N. Michael, "Multi-Robot Persistent Coverage with stochastic task costs," in 2015 IEEEIRSJ International Conference on Intelligent Robots and Systems (/ROS), Hamburg, 2015.

N. Nigam, S. Bieniawski, L Kroo and J. Vian, "Control of Multiple UAVs for Persistent Surveillance: Algorithm and Flight Test Results," IEEE Transactions On Control Systems Technology, vol. 20, No. 5, pp. 1236-1251, 2012.

A. Ulusoy, S. L. Smith, X. C. Ding, C. Belta and D. Rus, "Optimality and robustness in multi-robot path planning with temporal logic constraints," The International Journal of Robotics Research, pp. 889-911, 2013.

C. Pippin and H. Christensen, "Trust modeling in multi-robot patrolling," in IEEE International Conference on Robotics & Automation (ICRA), Hong Kong, 2014.

D. Pippin, H. Christensen and L. Weiss, "Performance based task assignment in multi-robot patrolling," in Proceedings of the 28th annual ACM symposium on applied computing, Coimbra, 2013.

D. Portugal and R. Rocha," A Survey on Multi-robot Patrolling Algorithms. In: Camarinha-Matos L.M. (eds) Technological Innovation for Sustainability. DoCEIS 2011. IFIP Advances in Information and Communication Technolog," Berlin, 2011.

N. Nigam, "The Multiple Unmanned Air Vehicle Persistent Surveillance Problem: A Review," Machines, vol. 2, No. 1, pp. 13-72, 2014.

In-Situ, "Aquaculture Buoy with RDO® Titan Probe," In-Situ Inc., [Online], Available: https://in- situ.com/wp-content/Liploads/2014/11/Aquaculture_Buoy_Manual_Post_05-13.pdf. [Accessed Jan. 31, 2018].

B. Ouyang, P. Wills, F. Dalgleish and A. Dalgleish, "Systems and Methods for Larval Fish Enumeration and Growth Monitoring". U.S. Appl. No. 15/877,941, filed Jan. 23, 2018.

W. Paul, R. Martin and B. Ouyang, "Alternating Angle Controlled Wavelength Lighting System to Stimulate Feeding in Larval Fish". USA U.S. Appl. No. 15/277,737, filed Sep. 27, 2016.

B. Ouyang, W. Hou, F. M. Caimi, D R. Fraser, A. K. Vuorenkoski and C. Gong, "Integrating dynamic and distributed compressive sensing techniques to enhance the image quality of the compressive line sensing system for UAV application," SPIE Journal of Applied Remote Sensing, vol. 11, No. 3,2017.

B. Ouyang, F. Dalgleish and A. Dalgleish, "Mems microdisplay optical imaging and sensor systems for underwater and other scattering environments". USA Patent 9,019,503, Apr. 28, 2015.

Z. Cao, J. Principe, B. Ouyang, F. Dalgleish and A. Vuorenkoski, "Marine animal classification using combined CNN and hand-designed image features," in IEEE/MTS Oceans, Baltimore, 2015.

D. L. White, S. Esswein, J. 0. Hallstrom and C. Post, "The Intelligent River©: Implementation of Sensor Web Enablement technologies across three tiers of system architecture: Fabric, middleware, and application," in 2010 International Symposium on Collaborative Technologies and Systems (CTS), 2010.

G. W. Eidson, S. Esswein, J.B. Gemmill, J. 0. Hallstrom, T. R. Howard, J. K. Lawrence, C. J. Post, C. B. Sawyer, K.-C. Nang and D. L. White, "The South Carolina Digital Watershed: Endto-End Support for Realtime Management of Water Resources," International Journal of Distributed Sensor Networks, vol. 6, No. 1, 2010.

Idronaut, "Dissolved Oxygen Sensors," Idronaut S.r.L, [Online], Available:https://www.idronaut.it/wp-content/uploads/2019/06/Polarographic-Oxygen-Sensor-Leaflet.pdf. [Accessed Jan. 20, 2018].

Amgren, "Miss Hydrofoam," Amgren.net, [Online], Available: http://www.amgren.net/miss- hydrofoam.html. [Accessed Jan. 31, 2018].

Y. Li, T.-C. Su, B. Ouyang, F. Dalgleish and A. Dalgleish, "Field Testing and Numerical Modeling of Inflatable Structure tor Underwater Applications," Advances in Civil Engineering Materials, vol. 6,No. I,pp. 403-411,2017.

B. Ouyang, Y. Li, T.-C. Su, F. Dalgleish, A. Dalgleish and F. Ahmad, ""Compressing Two Ways": the Initial Study of an Underwater Inflatable Co-prime Sonar Array (UICSA)," in Proceedings of SPIE 10658, Orlando, 2018.

Hobbyzone, "TidewaterEP Seaplane TxRPrime SLT," Flyzone, [Online]. Available: https://www.hobbyzone.com/Tyzone/airplanes/txr/FLZA3332.html. [Accessed Jan. 31, 2018].

YSI, "YSI Professional Plus User Manual," YSI Incorporated, 2009.

C. P. Antonopoulos and N. S. Voros, "Resource efficient data compression algorithms for demanding, WSN based biomedical applications," Journal of Biomedical Informatics, vol. 59, pp. 1-14, 2016.

J. Valasek, D. Famularo and M. Marwaha, "Fault-Tolerant Adaptive Model Inversion Control for Vision-Based Autonomous Air Refueling," Journal of Guidance, Control, and Dynamics, vol. 40, No. 6,pp. 1336-1347,2017.

(56) References Cited

OTHER PUBLICATIONS

J. Currie, C. B. Gillis, J. A. Carretero, R. Dubay, T. Jeans and G.D. Watt, "Dynamics of two active autonomous dock mechanisms for AUV recovery," Trans. Can. Soc. Meeh Eng., vol. 38, No. 2, pp. 213-226,2014.

C. E. Boyd, R. P. Romaire and E. Johnston, "Predicting Early Morning Dissolved Oxygen Concentrations in Channel Catfish Ponds," Transactions of the American Fisheries Society, vol. 107, No. 3,pp. 484-492,1978.

L. Xu and S. Liu, "Study of short-term water quality prediction model based on wavelet neural network," Mathematical and Computer Modelling, vol. 58, No. 3-4, pp. 807-813, 2013.

A. Sarkar and p. Pandey, "River Water Quality Modelling Using Artificial Neural Network Techniqu," Aquatic Procedia, vol. 4, pp. 1070-1077, 2015.

Y. Ding, Y. Cai, p. Sun and B. Chen, "The Use of Combined Neural Networks and Genetic Algorithms for Prediction of River Water Quality," Journal of Applied Research and Technology, vol. 12,No. 3,pp. 493-499,2014.

P. Razvan, T. Mikolov and Y. Bengio, "On the difficulty of training recurrent neural networks," in 30th International Conference on Machine Learning, 2013.

S. Hochreiter and J. Schmidhuber, "Long short-term memory," Neural Computation, vol. 9, No. 8, pp. 1735-1780, 1997.

D. Portugal and R. Rocha, "Distributed multi-robot patrol: a scalable and fault-tolerant framework," Robot. Auton. Syst., vol. 61, No. 12, pp. 1572-1587, 2013.

Ardupilot, "Pixhawk 2 (TheCube) Overview," Ardupilot, [Online]. Available: http://ardupilot.org/copter/docs/common-pixhawk2-overview.html. [Accessed Jan. 9, 2018].

Hex.Aero, "Pixhawk v2 Feature Overview," Hex.Aero, 2016.

Appcon Wireless, "Lora Module: Ultra long range RF1276," Appcon Wireless, [Online], Available: http://www. appconwireless.com/ProShow.asp?id=337. [Accessed Feb. 2, 2018].

Beagleboard.Org, "BeagleBone@ Blue," beagleboard.org, [Online]. Available: https://beagleboard.org/blue. [Accessed Feb. 1, 2018].

Ardupilot.Org, "Mission Planner Home," Ardupilot, 2016. [Online]. Available: http://ardupilot.org/planner/. [Accessed Feb. 3, 2018].

ROS wiki, "patrolling_sim," ROS.org, Jun. 21, 2016. [Online], Available: http://wiki.ros.org/patrolling_sim. [Accessed Jan. 12, 2018].

C. Anderson, "Using ROS Gazebo simulator with ArduCopter," DIYDrone, Aug. 27, 2015. [Online], Available: https://iiydrones.com/profiles/blogs/using-ros-gazebo-simulator-with-arducopter. [Accessed Jul. 21, 2017].

Tensorflow.Org, "TensorFlow Programmer's Guide," tensorflow.org, [Online], Available: https://www.tensorflow.org/programmers_guide/. [Accessed Aug. 2, 2017].

C. R. Engle, "Determining the Profitability of an Aquaculture Business: Using Income Statements and Enterprise Budgets," Southern Regional Aquaculture Center, Stoneville, Mississippi, 2012.

C.R. Engle, S. Pomerleau and G. Kumar, "Tools for," University of Arkansas at Pine Bluff, Pine Bluff, Arkansas , Tools tor financial management of fish farms. CD-ROM..

Y. Chapre, P. Mohapatra, S. Jha and A. Seneviratne, "Received signal strength indicator and its analysis in a typical WLAN system (short paper)," in 2013 IEEE 38th Conference on Local Computer Networks (LCN), Sydney, 2013.

P. Mahonen, J. Riihijarvi and A. Kivrak, "Statistical characterization of transmitter locations based on signal strength measurements," in 2010 5th IEEE International Symposium on Wireless Pervasive Computing (ISWPC), Modena, 2010.

R. J. Hyndman and A. B. Koehler, "Another look at measures of forecast accuracy," International Journal of Forecasting, vol. 22, No. 4, pp. 679-688, 2006.

A. Rorrer, "Cise Reu A la Carte Student POST-Survey 2016," NSF, 2016. [Online], Available: https://reu.uncc.edu/cise-reu-toolkit [Accessed Jan. 31, 2018].

H. Jiang and J. 0. Hallstrom, "Fast, Accurate Event Classification on Resource-Lean Embedded Sensors," ACM Transactions on Autonomous and Adaptive Systems, vol. 8, p. p. #11,2013.

H. Jiang, J. Zhai, S. K. Wahba, B. Mazumder and J. 0. Hallstrom, "Fast Distributed Simulation of Sensor Networks using Optimistic Synchronization," IEEE Transactions on Parallel and Distributed Systems, vol. 25, No. 11, p. 1, 2014.

Y. Guo, L. E. Parker and R. Madhavan, "Towards collaborative robots for infrastructure security applications," in Proceedings of International Symposium on Collaborative Technologies and Systems, 2004.

L. E. Parker, "Multiple Mobile Robot Systems," in Springer Handbook of Robotics, Berlin, Springer, 2008, pp. 921-941.

X. Miao, C. Deng, X. Li, Y. Gao and D. He, "A Hybrid Neural Network and Genetic Algorithm Model for Predicting Dissolved Oxygen in an Aquaculture Pond," in IEEE 2010 International Conference on Web Information Systems and Mining (WISM), Sanya, China, 2010.

A. Araujo, D. Portugal, M. S. Couceiro and R. Rocha, "Integrating Arduino-Based Educational Mobile Robots in ROS," J Intell Robot Syst, pp. 281-298, 2015.

* cited by examiner

FIG. 7

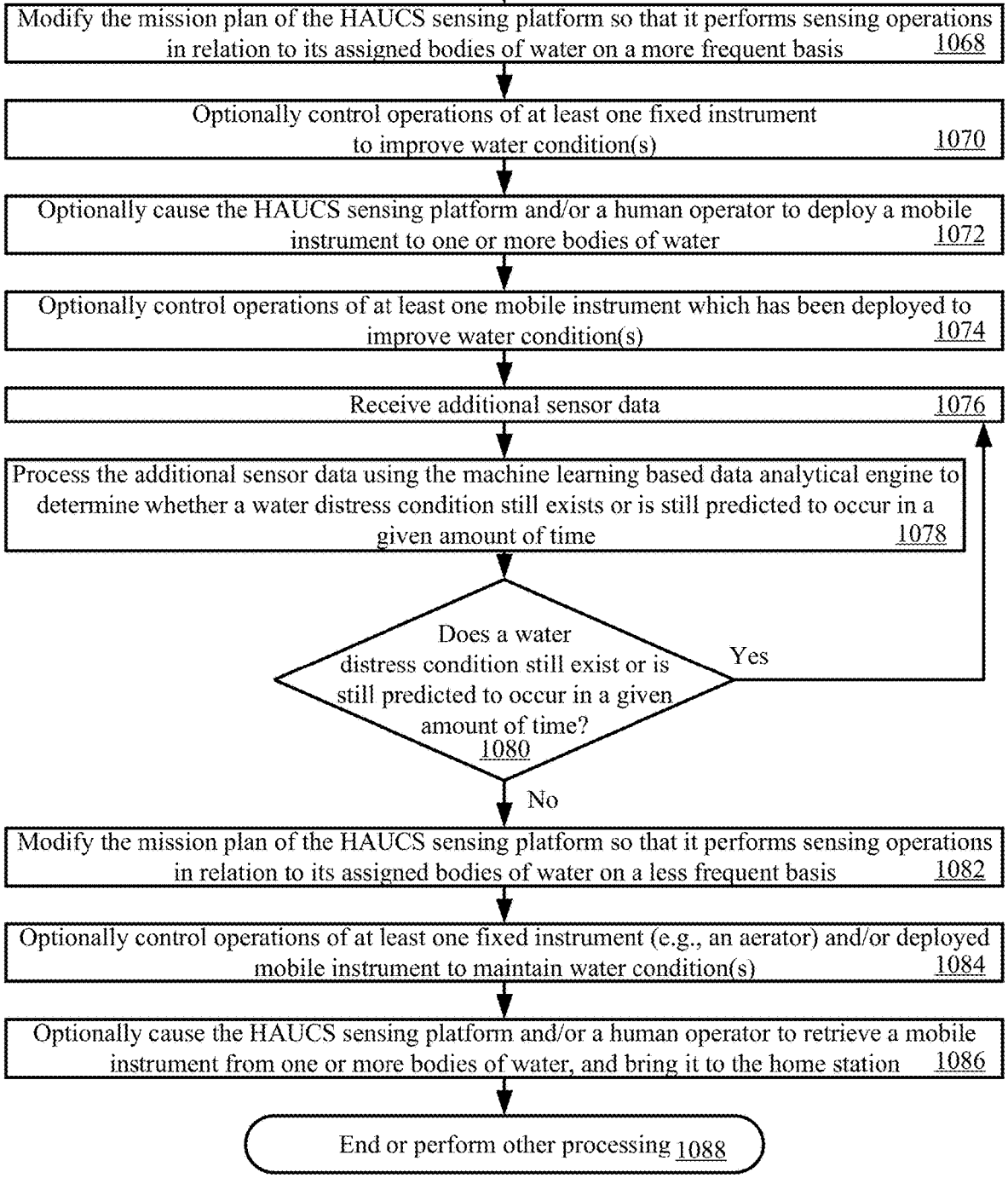

From FIG. 11B

| Optionally controlling operations of at least one fixed instrument to improve the water condition of the body of water, when a determination is made that the water distress condition exists or is predicted to occur in a given amount of time  1138 |

| Optionally cause the HAUCS sensing platform to autonomously deploy a mobile instrument to the body of water when a determination is made that the water distress condition exists or is predicted to occur in a given amount of time  1140 |

| Optionally control operations of the mobile instrument to improve the water condition of the body of water once the mobile instrument has been deployed  1142 |

| Use the machine learning based analytical engine and additional sensor data to determine whether the water distress condition no longer exists or is no longer predicted to occur  1144 |

| Modify the pre-specified mission plan to once again change the at least one operating parameter of the HAUCS sensing platform when a determination is made that the water distress condition no longer exists or is no longer predicted to occur  1146 |

| Optionally control operations of at least one fixed instrument to maintain the water condition of the body of water, when a determination is made that the water distress condition no longer exists or is no longer predicted to occur  1148 |

| Optionally cause the HAUCS sensing platform to autonomously retrieve a mobile instrument from the body of water when a determination is made that the water distress condition no longer exists or is no longer predicted to occur  1150 |

End or perform other processing 1152

FIG. 11C

HYBRID AERIAL/UNDERWATER ROBOTICS SYSTEM FOR SCALABLE AND ADAPTABLE MAINTENANCE OF AQUACULTURE FISH FARMS

CROSS-REFERENCE TO RELATED APPLICATIONS

The present application claims priority to U.S. Provisional Patent Application No. 62/843,907, which was filed on May 6, 2019. This Provisional Application is incorporated by reference herein in its entirety.

STATEMENT OF FEDERALLY SPONSORED RESEARCH AND DEVELOPMENT

This invention was made with government support under Contract No. 2019-67022-29204 awarded by the National Institute of Food and Agriculture/USDA. The government has certain rights in the invention.

FIELD

This document relates generally to robotic systems. More particularly, this document relates to implementing systems and methods for providing a hybrid arial/underwater robotic system to facilitate scalable and adaptable maintenance of aquaculture fish farms.

BACKGROUND

Fish farming plays an important role in securing food safety in the United States and around the world. Since 2014, more farmed fish than wild-caught fish are consumed globally, and half of all seafood comes from farms. However, for fish farming to be sustainable and economically viable, drastic improvements to current labor-intensive and resource-inefficient operations are required.

SUMMARY

The present disclosure concerns implementing systems and methods for operating a system including at least one Hybrid/Aerial Underwater Robotics System ("HAUCS") sensing platform. The methods comprise: performing autonomous operations by an Unmanned Aero-Amphibious Vehicle ("UAAV") of the HAUCS sensing platform to travel to a first location in proximity to a body of water by at least one of air, land and water in accordance with a pre-specified mission plan; actuating a mechanical device to transition at least one sensor of the HAUCS sensing platform from a retracted position in which the at least one sensor is adjacent to the UAAV to an extended position in which the at least one sensor resides a given distance from the UAAV, when the HAUCS sensing platform is at the first location; performing operations by the HAUCS sensing platform and the at least one sensor to collect first sensor data concerning a water condition of the body of water at a plurality of different depths while the HAUCS sensing platform is at the first location; actuating the mechanical device to transition the at least one sensor of the HAUCS sensing platform from the extended positon to the retracted position after the first sensor data has been collected; causing the first sensor data to be processed using a machine learning based analytical engine to determine whether a water distress condition exists or is predicted to occur in a given amount of time; and modifying the pre-specified mission plan to change at least one operating parameter of the HAUCS sensing platform (e.g., a sampling or patrolling frequency, or a sampling or patrolling pattern) when a determination is made that the water distress condition exists or is predicted to occur in a given amount of time. A bias may be introduced in a training of a machine learning model employed by the machine learning based analytical engine to reduce false negatives that are undesirable in water condition monitoring.

In some scenarios, the methods also comprise: performing autonomous operations by the UAAV to travel to a second location in proximity to the body of water by at least one of air, land and water in accordance with the pre-specified mission plan; actuating the mechanical device to transition the at least one sensor of the HAUCS sensing platform from the retracted position to the extended position, when the HAUCS sensing platform is at the second location; performing operations by the HAUCS sensing platform and the at least one sensor to collect second sensor data concerning the water condition of the body of water at the plurality of different depths while the HAUCS sensing platform is at the second location; and actuating the mechanical device to transition the at least one sensor of the HAUCS sensing platform from the extended positon to the retracted position after the second sensor data has been collected. The second sensor data is additionally used by the machine learning based analytical engine to determine whether the water distress condition exists or is predicted to occur in the given amount of time.

In those or other scenarios, the methods also comprise: performing autonomous operations by the UAAV to travel to a home station in accordance with the pre-specified mission plan; performing operations by the home station to automatically clean the at least one sensor when the HAUCS sensing platform is docked at the home station; performing operations by the home station to automatically recharge a power source of the HAUCS sensing platform when the HAUCS sensing platform is docked at the home station.

In those or other scenarios, the methods also comprise: performing operations by the HAUCS sensing platform to collect at least one of a water sample, a moribund animal, or a dead animal; taking at least one evasive action by the UAAV when a particular weather condition exists; and/or transitioning a vehicle mode of the UAAV in view of a current weather condition from an aerial vehicle mode to an unmanned terrain vehicle mode, a sailing mode, a kite mode, or a submarine mode. Notably, the weather condition information can be obtained from integrated terrestrial stations, the HAUCS, or other data sources (e.g., online sources).

In those or other scenarios, the methods also comprise performing the following operations when a determination is made that the water distress condition exists or is predicted to occur in a given amount of time: controlling operations of at least one fixed instrument to improve the water condition of the body of water; causing the HAUCS sensing platform to autonomously deploy a mobile instrument to the body of water when a determination is made that the water distress condition exists or is predicted to occur in a given amount of time; and/or controlling operations of the mobile instrument to improve the water condition of the body of water once the mobile instrument has been deployed.

In those or other scenarios, the methods also comprise: using the machine learning based analytical engine and additional sensor data to determine whether the water distress condition no longer exists or is no longer predicted to occur; and modifying the pre-specified mission plan to once again change the at least one operating parameter of the HAUCS sensing platform when a determination is made that the water distress condition no longer exists or is no longer predicted to occur. When a determination is made that the water distress condition no longer exists or is no longer predicted to occur, one or more of the following operations may additionally be performed: controlling operations of at least one fixed instrument to maintain the water condition of the body of water; and/or causing the HAUCS sensing platform to autonomously retrieve a mobile instrument from the body of water when a determination is made that the water distress condition no longer exists or is no longer predicted to occur.

DESCRIPTION OF THE DRAWINGS

The present solution will be described with reference to the following drawing figures, in which like numerals represent like items throughout the figures.

FIGS. 7(a)-(b) (collectively referred to herein as "FIG. 7) provides a table of mission dissolved oxygen value predictions using the proposed structure.

FIGS. 10A-10D (collectively referred to herein as "FIG. 10") provide a flow diagram of an illustrative method for operating a system, including HAUCS sensing platforms.

FIGS. 11A-11C (collectively referred to herein as "FIG. 11") provide a flow diagram of an illustrative method for operating a system, including at least one HAUCS sensing platform.

DETAILED DESCRIPTION

Figure 1:
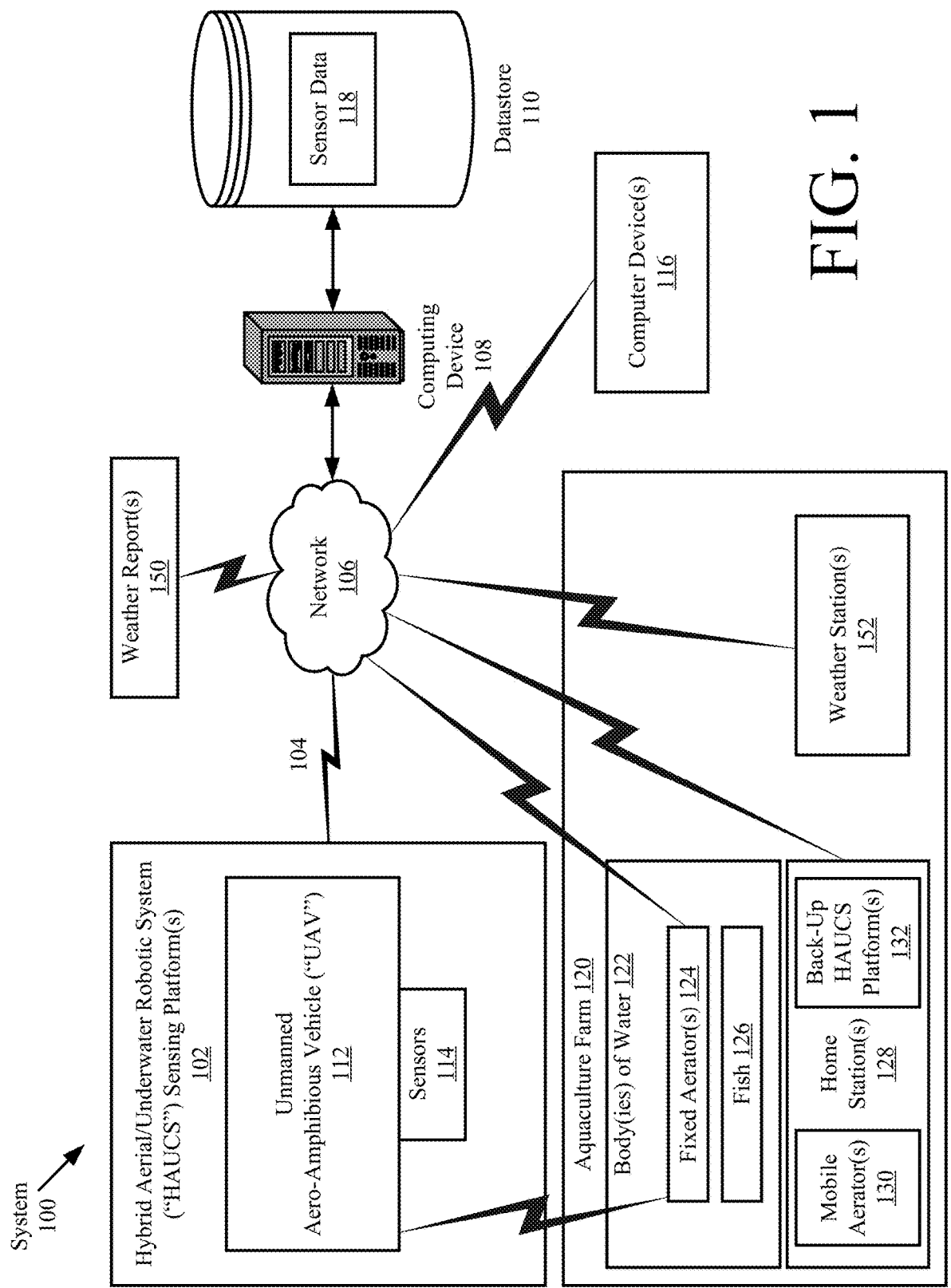
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Precision agriculture ("PA") is the application of robotic field machines and information technology in agriculture. PA is playing an increasingly important role in farm production. PA related robotic technology has been an active research topic and has seen robust growth. By USDA estimation, between 1998 and 2013, the three key PA technologies (i.e., Global Positioning System ("GPS") yield and soil monitors/maps, Variable-Rate input application Technologies ("VRT"), and GPS guidance systems) have seen adoption rates ranging from twenty-five percent to fifty percent. Many PA applications call for multiple collaborative robots, which are closely related to the general topics of the Multi-Robot Patrol Problem ("MRPP") or the Multi-Robot Persistent Coverage Problem ("MRPCP"). MRPCP aims to continuously monitor an area of interest and to minimize the time between the visits to the same region. These topics have gained strong interests in the research community and NSF support. However, aquaculture farming is an important sector of agriculture that has seen minimal robotic development.

The Internet of Things ("IoT") has been adopted to improve productivity and efficiency in agriculture. Aquaculture farming is an important, fast-growing sector of agriculture that has seen the applications of advanced technologies such as robotics and IoT.

IoT solutions have been adopted to realize automated feeding on fish farms to reduce feed waste and avoid water pollution from the application of excessive feed. In computer-vision based automatic feeder designs, videos are streamed via Bluetooth to a control center where the fish feeding behavior is analyzed to determine the degree of hunger, which in turn, controls feeder operation. While such a system might be viable for a small-scale fish tank, it would be challenging to scale up to a fish farm with numerous larger ponds (e.g., >2 hectares). To this end, eFishery is a more realistic IoT-based fish feeder system. The eFishery system is essentially an enhancement demand feeder. One novel design in eFishery is that a vibration sensor is adopted to detect fish activity near the feeder. The sensor data is sent back to the control center for analysis to determine the degree of hunger in the pond, which controls the operation of the feeder. Every feeding event initiated by the feeder is recorded automatically to allow the farm to monitor feed expenses.

In aquaculture fish farms, management of water quality (e.g., Dissolved Oxygen ("D.O.")) is critically important for successful operation. D.O. depletion is a leading cause of fish loss on farms. Catastrophic loss can occur within hours if ponds aren't managed properly. The current management practice on pond-based farms is the use of human operators who drive trucks or other all-terrain vehicles throughout the day and night, sampling D.O. in each culture pond, targeting a sampling frequency of at least once per hour. The associated labor and equipment costs limit the scope and frequency of such sampling efforts since dozens of ponds must be managed by each truck. Large farms require multiple drivers and sampling instruments to attain the required monitoring frequency. Also, the level of resolution that this approach is able to achieve on any single pond is generally restricted to a single near-shore measurement at a point on the pond that has a well-maintained roadbed. On large ponds (e.g., 2 to 8 hectares or 5 to 20 acres), this can result in a failure to promptly identify localized water quality problems that can ultimately affect a large proportion of the crop. Multiple measurements are only taken on ponds that are in a state of depressed D.O. and receiving supplemental aeration. The measurement of additional water quality parameters cannot be done due to the demanding schedules required of drivers to achieve the minimum measurement frequency. Even though readings should be taken hourly on each pond, very large farms (e.g., farms that are greater than 1000 acres), with hundreds of ponds may only be able to take readings every other hour or every third hour due to labor and equipment costs of operating large fleets of monitoring vehicles. Furthermore, with the current practice, operators have a very limited window of time (e.g., less than an hour or so in the middle of the night) to react to potential oxygen depletion, increasing the potential likelihood of catastrophic events, and the response (e.g., putting emergency aeration equipment in a pond) takes time away from achieving D.O. measurement frequencies.

There have been attempts to reduce labor costs by automating aquaculture pond monitoring, such as the Aquaculture Pond Buoy from In-Situ Inc. of Fort Collins, Colo. Other IoT water quality monitoring solutions include Neer Yantra from PranisCOM and PondGuard from Eruvaka. These and many other solutions employ buoy-based monitoring stations that measure pond-water quality parameters such as D.O., temperature, pH, etc. Sensor data can be sent via WiFi or cellular link to a control center for analysis. However, such stationary instruments are difficult to maintain due to biofouling and can be cost-prohibitive since they require one sensor for each pond. Also, a stationary instrument suffers from the same limitation as truck-based monitoring since only a single location is monitored unless multiple expensive sensor buoys are deployed in each pond. Sensor buoys are an obstruction in the pond during harvest since they have to be removed or lifted over the seine. This is mitigated a bit by wireless buoys, but wired buoys are excessively cumbersome for operators.

To mitigate these issues, the present solution provides a HAUCS sensing platform. HAUCS is a transformative robotic system that brings fundamental innovations to how aquaculture farms operate. HAUCS conducts automated sampling at frequencies relevant for accurate prediction of water quality variation (e.g., hourly diel readings), providing significant advantages in speed, cost, resource efficiency and adaptability over the traditional manual and truck-mounted water quality measurement systems on the farms. HAUCS is capable of collaborative monitoring and decision-making on farms of varying scales. HAUCS is an end-to-end framework consisting of three essential subsystems: a team of collaborative aero-amphibious robotic sensing platforms capable of air, land and water movements, integrated with underwater sensors; a land-based home station that provides automated charging and sensor cleaning; and a backend processing center consisting of a machine learning based water quality prediction model and farm control center. Each HAUCS platform covers a subset of ponds, and automatically acquires sensor data in each pond at a regular interval. The amphibious design enables the platform to move over the levee separating the ponds and to better cope with the severe weather such as high wind. The automatic cleaning at the land-based home station significantly reduces the risk of sensor biofouling. The "brain" in the backend processing center provides "several-steps-ahead" predictions of the pond water quality, detects upcoming compromised water quality (such as dissolved oxygen depletion) and mitigates a pond distress either automatically or in close collaboration with the human site managers and operators.

The HAUCS framework is a disruptive technology that has the potential to markedly increase adoption of robotic technology in the field of aquaculture farming, a sector of agriculture that has seen minimal robotics development. The HAUCS framework allows one critical factor plaguing aquaculture farming to be overcome—the high-cost and unreliability of water quality controls, in particular, dissolved oxygen depletion. Moreover, the underlying rationale and methodology of building an "internet of things" framework is to enhance the HAUCS's capacity to integrate multiple tasks typically performed on aquaculture farms. This technology, therefore, has significant social, environmental, and economic benefits, and can fundamentally transform how pond aquaculture is conducted in the United States and around the world.

As a whole, the HAUCS framework is innovative and streamlines continuous monitoring, maintenance, and forecasting of next-generation fish farms. The HAUCS framework offers a highly flexible and scalable solution that can be adapted to a diversity of farms to achieve farm-level and pond-level monitoring. The machine learning based data analytical engine allows farmers to stay "several-steps-ahead" of any potential catastrophic event, such as dissolved oxygen depletion. The HAUCS platform design integrates an aero-amphibious platform and underwater sensors, providing a foundation for fully automated aquaculture maintenance. The water quality data collected provides for a better understanding of water quality dynamics in aquaculture ponds that will lead to improvements in efficiency and reliability of pond aquaculture, and thus help to ensure food security. Compared with state-of-the-art, the HAUCS framework has the following advantages: improved scalability (capable of collaborative monitoring and decision-making on farms of varying scales); more accurate reporting of pond conditions (capable of sampling multiple locations in the pond to monitor spatial and temporal pond variations); mitigating biofouling (avoiding maintaining sensors in bio-productive water); and avoiding single point coverage (novel sensing patterns can be realized to cover different areas on a large pond).

A major reason for the low adoption of robotic technology in aquaculture fish farming is the lack of accessibility to technology for the fish farmers. A HAUCS demonstration site can be established. Such a HAUCS demonstration site is highly beneficial in educating farmers with the goal to significantly improve the penetration of robotic technology in the fish farming industry.

Referring now to FIG. 1, there is provided an illustration of an illustrative system 100. System 100 comprises at least one HAUCS sensing platform 102 that facilitates improved aquaculture farming, reduced water and pesticide use, improved water quality monitoring, and/or wetland assessment activities. For example, the HAUCS sensing platform 102 can be used in agriculture fields to support precision agriculture initiatives designed to reduce water and pesticide use, in rivers to support water quality monitoring, and/or in swamps to support wetland assessment activities. In the scenario where system 100 comprises two or more HAUCS sensing platforms 102, operations of the HAUCS sensing platforms 102 are coordinated to provide persistent, accurate and up-to-date situational awareness and to collaborate with human operators to accomplish water quality control. Each HAUCS sensing platforms 102 may be autonomously controlled and/or controlled remotely via a remote control operated by a human operator.

The HAUCS sensing platform 102 is designed to be (1) power efficient so that it can cover multiple bodies of water on an hourly basis under all weather conditions, (2) relatively easy to maintain, (3) relatively inexpensive to manufacture, replace and/or repair, and/or (4) able to report sensor data to centralized computing device(s) 108 in real-time or almost real-time in all weather conditions. In this regard, the HAUCS sensing platform 102 includes a UAAV 112. The UAAV 112 can include, but is not limited to, a Vertical Take-Off and Land ("VTOL") based drone, quadcoptor, and/or a thrust vectoring coaxial drone. For example, the UAAV 112 comprises a coaxial-rotor-coptor drone or coaxial drone that uses two contra-rotating rotors to compensate each other's torque. Coaxial drones are well known in the art, and therefore will not be described herein. Some of the known coaxial drones include: a Sprite available from Ascent AeroSystems of Newtown, Conn.; a Navi drone available from Aeronavics of New Zealand; and a TDrone available from the Acceleration Technology Co. Ltd. of the Peoples Republic of China.

The UAAV 112 is able to travel on/in water, on land, and in the air. For example, the UAAV 112 can travel on/in bodies of water 122, fly over the bodies of water 122, travel on levees, fly over the levees, and/or travel to/from home station(s) 128. The present solution is not limited to the particulars of this example. In this regard, it should be noted that the UAAV 112 may have an environmentally sealed housing such that dirt and water do not enter the same and cause damage to internal components of the UAAV. Environmentally sealed housings are well known in the art, and therefore will not be described in detail here. The environmentally sealed housing can include plastic parts or carbon fiber parts that are coupled to each other with water-tight seals formed therebetween by gaskets, o-rings, welds, etc.

The UAAV 112 is also: able to perform hybrid movements and flight mode transitions to adapt to the terrain and weather; capable of avoiding obstacles at fixed locations (e.g., fixed aerators 124) and/or moving obstacles (e.g., mobile emergency aerators 130 or human operated vehicles (not shown)); and able to react to any body of water 122 in distress by increasing its patrolling frequency and/or dispatching mobile emergency aerator(s) to that body of water.

The UAAV 112 provides an all-weather coverage capability to system 100 that is important for aquaculture farm monitoring operations (especially in high-wind conditions). The HAUCS sensing platform 102 is able to cover an entire aquaculture farm 120 in a reasonable period of time with high location precision, cost reductions, and/or biofouling reductions.

Sensors 114 are coupled to the UAAV 112. This coupling can be achieved using adhesives, mechanical couplers (e.g., straps, clamps, nuts/bolts, screws, etc.), weld(s) and/or other coupling means. The sensors 114 include, but are not limited to, dissolved oxygen sensors, Inertial Measurement Units ("IMUs"), barometers, temperature sensors, humidity sensors, wind speed sensors, wind direction sensors, rain sensors, solar radiation sensors, water pollution sensors, water contaminant sensors, water level sensors, turbidity sensors, pH sensors, fungus detectors, parasite detectors, biological oxygen demand sensors, oxidation reduction potential sensors, colored dissolved organic matter sensors, salinity/conductivity sensors, cameras (e.g., digital, hyperspectral, etc.), a microphone, spectrographic sensors, chlorophyll sensor, and/or vibration sensors. Each of the listed sensors is well known in the art, and therefore will not be described herein. The sensors 114 can be selected so that their collective weight is relatively light (e.g., 50 g).

As the UAAV 112 travels in, over or between bodies of water 122, the sensors 114 generate sensor data and communicate the same to the UAAV 112. The sensors 114 may be at least partially submerged in water by the UAAV 112 during sensing operations. The UAAV 112 communicates the sensor data to a remote computing device 108 via a wireless communication link 104 and a network 106. Network 106 can include, but is not limited to, a wide area network (e.g., a Long Range ("LoRa") communications network), the Internet, a cellular network, and/or a radio network. The sensor data generated by the sensors 114 can be processed by the computing device 108 using a machine learning based data analytical engine (not shown in FIG. 1) to predict a condition of the body of water 122. The sensor data, timestamps and/or the predicted condition of the body of water 122 may be stored in a datastore 110.

The machine learning based data analytical engine employs a prediction model that is trained using weather data from weather reposts 150 and/or weather stations 152, timestamp data, and/or sensor data associated with all bodies of water in the aquaculture farm 120 that are used to raise fish 126 or other animals. The prediction model can be used to cause changes in the behavior of the HAUCS sensing platform 102 to mitigate emergency situations and/or optimize the yield of farmed fish or other animals. For example, the patrolling frequency of the HAUCS sensing platform 102 may be increased or decreased based on model predictions, and/or a fixed aerator 124 is caused to be automatically or manually activated based on model predictions. Additionally or alternatively, a human operator or a HAUCS sensing platform is instructed to deploy a mobile aerator in a partial body of water at a given location therein. The deployed mobile aerator is then automatically or manually enabled or activated. The present solution is not limited to the particulars of this example.

The sensor data and/or predicted conditions of the body(ies) of water 122 may be presented to users on computing device(s) 116. Computing device(s) 116 can include, but is not limited to, personal computer(s), laptop computer(s), tablet computer(s), personal digital assistant(s), and/or smart phone(s). The graphical user interface ("GUI") for accessing and viewing such information may be Personal Computer ("PC") software based, web browser based, and/or mobile application based. In the mobile application scenarios, the GUI may include a dashboard panel with text message instructions to allow the operator to quickly react to any emergency situation.

The computing device 108 is provided to handle automatic emergency responses by the HAUCS platform(s) 102. Once a body of water 122 is declared by computing device 108 to be in distress using the prediction model, an automatic emergency response process of system 100 is invoked. The automatic emergency response process may include, but is not limited to, deactivating fixed aerators 124, instructing field operators to deploy mobile aerators 130, activating the deployed mobile aerators 130, and/or increasing patrolling by HAUCS platform(s) 102. When the computing device 108 detects that the body of water 122 is no longer in distress, the deployed mobile aerators 130 are automatically deactivated by the computing device 108 and/or the HAUCS platform(s) 102. The HAUCS platform(s) 102 may also return to their home station(s) 128, and transition from emergency patrolling operations (e.g., with more frequent patrols) to normal patrolling operations (e.g., with less frequent patrols).

The HAUCS sensing platform 102 may be used to convert the aquaculture farm 120 operation to an Internet of Aquaculture. In this regard, it should be understood that the design of system 100 can be easily scaled up to a multi-area framework and/or multi-farm framework, where a data center gathers sensor data from all the areas and/or farms for analysis and prediction. In the multi-area framework scenarios, home stations 128 may be provided at several different locations across the aquaculture farm 120. Each home station 128 is assigned a coverage area (e.g., 100 ponds). Each home station 128 hosts one or more HAUCS sensing platforms 102 that are provided to monitor conditions of the respective coverage area. This multi-home station arrangement decreases UAAV traffic within the aquaculture farm 120. Upon completing a sensing session, each HAUCS sensing platform 102 returns to a respective home station 128, where automatic sensor cleaning may be performed in addition to or as an alternative to power source (e.g., battery) recharging. The home stations 128 may also serve as communication hubs through which sensor data is indirectly passed from the HAUCS sensing platforms 102 to the computing device 108. Each home station 128 may also house mobile aerators 130 and/or back-up HAUCS platform(s) 132.

Computing device(s) 108, 116 can also facilitate(s) mission planning for each HAUCS sensing platform and/or the simulation of planned HAUCS mission operations. In this regard, the computing device(s) 108, 116 employ(s) a mission planner and a simulator (e.g., ROS Gazebo integrated with Ardupilot and/or a RealFlight simulator available from Horizon Hobby LLC of Illinois). A GUI of the computing device(s) 108, 116 may provide a synoptic visualization of the aquaculture farm's status produced by the prediction model and/or the statuses of other resources (e.g., fixed aerator(s) 124, mobile aerator(s) 130). The GUI may also provide automatic emergency response notifications.

The mission control and path planning algorithm employed by system 100 is crucial to achieving the coordination among multiple HAUCS sensing platforms 102 to provide persistent, accurate and up-to-date situational awareness and to collaborate with human operators to accomplish farm water quality control. The mission control of a HAUCS sensing platform 102 is designed to meet the following challenges: reaction to pond in distress by increasing a HAUCS sensing platform's patrolling frequency and dispatching mobile emergency aerators to that pond; hybrid movements and flight mode transitions to adapt to the terrain and weather; and cable of avoidance of obstacles at fixed locations (e.g., fixed aerators) and moving obstacles (e.g., mobile emergency aerators or human operated vehicles).

Flight mode changes of the HAUCS sensing platforms 102 are handled by location based waypoint assignments: sampling waypoints (i.e., moving within the same body of water) and transition waypoints (i.e., moving to a different body of water or to a home station on land). To cope with severe weather, the computing device 108 maintains a third type of waypoint—protective waypoints. For example, upon the detection of potentially strong wind, the computing device 108 can update the waypoints to protective waypoints to allow the HAUCS sensing platforms 102 to take evasive actions. The computing device 108 can restore the waypoint status at a later time when the wind condition returns to normal.

Figure 2:
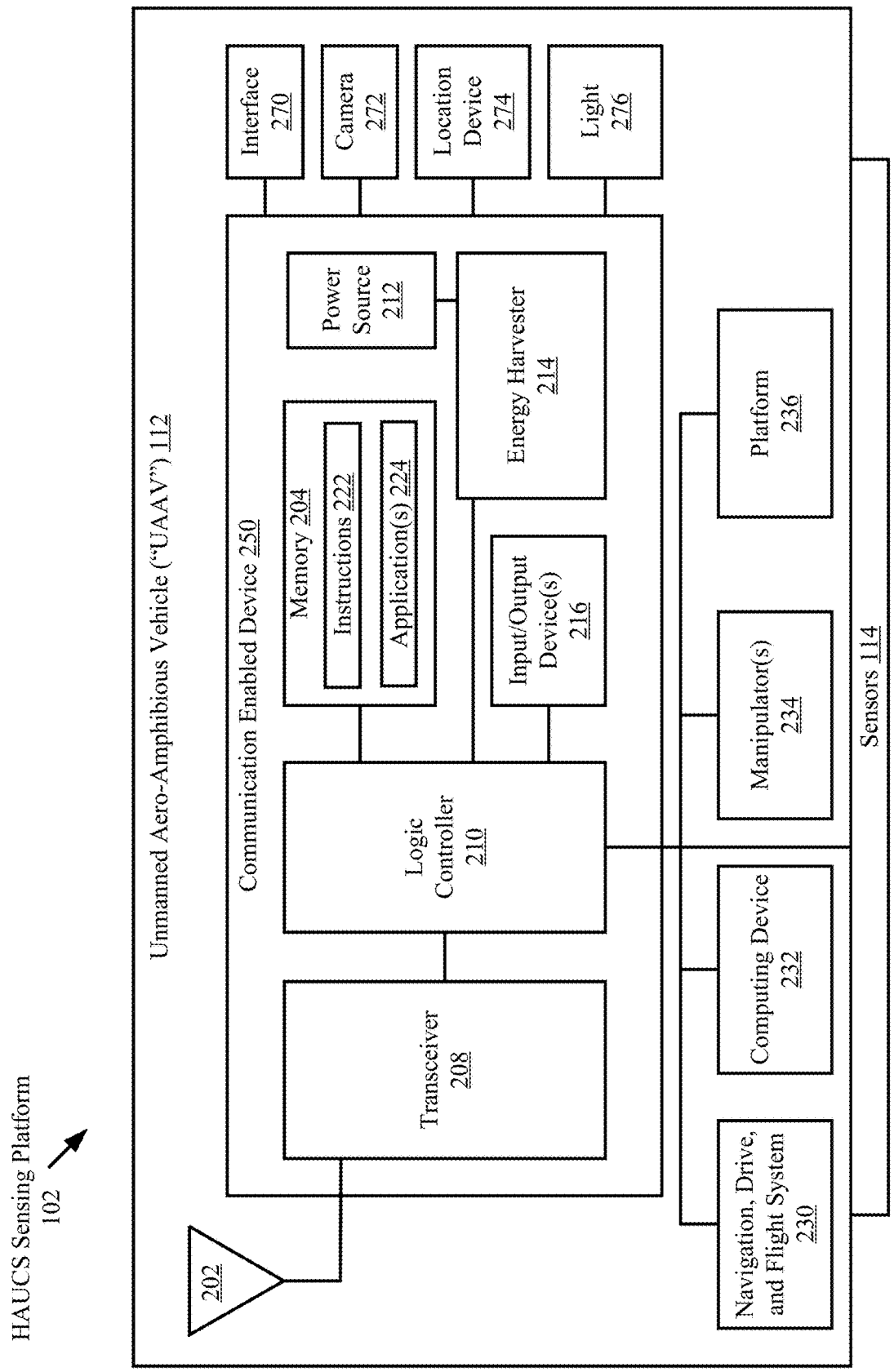
FIG. 2 is an illustration of an illustrative architecture for a HAUCS sensing platform of FIG. 1.

Referring now to FIG. 2, there is provided a detailed block diagram of an illustrative architecture for the HAUCS sensing platform 102 of FIG. 1. HAUCS sensing platform 102 may include more or fewer components than that shown in FIG. 2. However, the components shown are sufficient to disclose an illustrative embodiment implementing the present solution. Some or all of the components of the HAUCS sensing platform 102 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an illustrative architecture of a representative HAUCS sensing platform 102 configured to facilitate the mitigation of emergency situations and/or the optimization of the yield of farmed fish or other animals. In this regard, the HAUCS sensing platform 102 comprises a UAAV 112 with a communication enabled device 250 for allowing data to be exchanged with an external device (e.g., computing device 108 of FIG. 1, aerators 124, 130 of FIG. 1, other HAUCS sensing platforms 102, 132 of FIG. 1, and/or other devices) via a wireless communication technology. The communication technology can include, but is not limited to, cellular technology, radio frequency ("RF") technology, Bluetooth technology, and/or WiFi technology. The components 204-216 shown in FIG. 2 may be collectively referred to herein as the communication enabled device 250.

The communication enabled device 250 includes a power source 212. The power source 212 includes, but is not limited to, a battery (e.g., a Lithium polymer ("Li-Po") battery), capacitor(s), and/or an aluminum powder-based energy source. The aluminum powder-based energy source implements a method of activating bulk aluminum, and allowing the activated bulk aluminum to react with water to produce hydrogen gas and stream. The water used by the aluminum powder-based energy source can be stored in a tank of the UAAV 112. Additionally or alternatively, the water used by the aluminum powder-based energy source can be fetched by the UAAV 112 from a body of water 122 as the sensors 114 sense conditions of the body of water 122.

The battery and/or capacitor(s) may be rechargeable. The battery and/or capacitor(s) may be recharged when it rests in a cradle of or otherwise on a home station 128 of FIG. 1. Alternatively or additionally, the battery and/or capacitor(s) is(are) recharged by an energy harvester 214. Energy harvesters are well known in the art, and therefore will not be described herein. Any known or to be known energy harvester can be used herein without limitation. The energy harvester 214 can harvest energy from light, heat, RF fields, and/or magnetic fields.

For example, the battery is used to power the UAAV 212 during cruising, while a super capacitor is used to provide a burst of energy for a short period (e.g., less than one minute) during the UAAV's takeoff, the UAAV's landing, and/or when the UAAV transitions between plane mode and copter mode.

The communication enabled device 250 comprises an antenna 202 for allowing data to be exchanged with the external device via a wireless communication technology (e.g., RFID technology or other RF based technology). The external device may comprise computing device(s) 108, 116 of FIG. 1, aerators 124, 130 of FIG. 1, other HAUCS sensing platforms 102, 132 of FIG. 1, and/or other devices. In this case, the antenna 202 is configured to transmit signals to and received signals from the listed external devices. In this regard, the communication enabled device 250 comprises a transceiver 208. Transceivers are well known in the art, and therefore will not be described herein. However, it should be understood that the transceiver 208 receives signals including information from a transmitting device, and forwards the same to a logic controller 210 for extracting the information therefrom.

The extracted information can be used to initiate, enable, disable or modify operations of the UAAV 112. Accordingly, the logic controller 210 can store the extracted information in memory 204, and execute algorithms using the extracted information. For example, the logic controller 210 can: receive a command from the computing device(s) 108, 116 of FIG. 1 to initiate or activate normal or emergency sensing operations; cause a Navigation, Drive and Flight ("NDF") system 230 to operate such that the HAUCS sensing platform 102 follows a given path of travel through a geographic area via land/air/water, hover over certain geographic locations for given amounts of time (e.g., 30 seconds); cause the HAUCS sensing platform 102 to submerge the sensor(s) 114 in water at certain locations and for certain periods of time; cause the HAUCS sensing platform 102 to communicate sensor data to one or more external devices; cause the energy harvester 214 to collect energy and use the same to power one or more components of the HAUCS sensing platform 102; cause the HAUCS sensing platform 102 to return to a respective home station 128 of FIG. 1 (e.g., for recharging the power source 212 and/or maintenance of sensor(s) 114); cause a camera 272 to capture video and/or images as the HAUCS sensing platform 102 travels through the geographic area; cause the HAUCS sensing platform 102 to communicate with other devices in the geographic area; cause a computing device 232 to process sensor data and/or communicate results of the processing to external devices; cause data to be stored in memory 204; and/or cause the HAUCS sensing platform 102 to communicate with personnel. Camera 272 includes, but is not limited to, a visible camera, an IR camera and/or an UV camera.

In some scenarios, the UAAV 112 comprises manipulator(s) 234 (e.g., articulating or telescoping arms with grippers) to place aerators 130 or other devices at given locations in an aquaculture farm 120, and/or to collect samples of water, soil, plants and/or animals. Robotic manipulators are well known in the art, and therefore will not be described herein. Any known or to be known manipulator can be used herein without limitation. The UAAV 112 may optionally return to the home station 128 each time one or more samples are collected, and/or when a malfunction thereof is detected. The water samples can be analyzed by the UAAV 112, the home station 128, and/or at another location, for example, for off-flavor compounds (e.g., Geosmin and 2-Methylisoborneol).

As noted above, the camera 272 and/or sensors 114 are configured to obtain information about the conditions of a geographic area and/or body of water. This information is logged in memory 204, and/or communicated to an external datastore (e.g., a remote database). Memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

The camera 272 and/or sensors 114 have fixed or variable positions relative to the platform 236. In the variable position scenario, the camera 272 and/or sensors 114 are mounted to a retractable mechanical or electro-mechanical device that allows the devices 272, 114 to be retracted during the UAAV's flight and extended during sensing operations. Retractable mechanical and electro-mechanical devices are well known in the art, and therefore will not be described herein. For example, the retractable mechanical or electro-mechanical device can include, but is not limited to, a servo motor, a winch, gears, a mechanical linkage, a telescoping arm, a boom, and/or articular arm. The retractable feature of the sensors 114 allows for the minimization of contact between the platform 236 and the body of water 122, which reduces the energy consumption during operation of the HAUCS sensing platform.

In some scenarios, the retractable mechanism consists of four sections with a total extended length of six inches. During the deployment, the servo motor first tilts a module from a folded position, and a micro winch then lowers rods to form a rigid extension. To retrieve the module, the winch and the servo are operated in reverse order. The present solution is not limited to the particulars of this example.

Instructions 222 are stored in memory for execution by the communication enabled device 250 and that cause the communication enabled device 250 to perform any one or more of the methodologies of the present disclosure. The instructions 222 are generally operative to facilitate the mitigation of emergency situations and/or the optimization of the yield of farmed fish or other animals. Other functions of the communication enabled device 250 will become apparent as the discussion progresses.

In some scenarios, the computing device 324 employs an Open Autopilot software capable of controlling autonomous vehicles. The Open Autopilot software includes, but is not limited to, ArduPilot. A Robotic Operating System ("ROS") may be integrated with the Open Autopilot software in a Software-In-The-Loop ("SITL") fashion for tasks such as mission control and planning, flight mode modification, information retrieval, and/or sensor data acquisition. Interface 270 can provide a Human Machine Interface ("HMI") that will allow individuals to gain the overall farm situational awareness, to tasks or re-task HAUCS platforms, and/or to issue instructions to field operators (e.g., to move mobile aerators).

The UAAV 112 also includes a platform 236. The platform 236 is adapted to hold, contain and/or otherwise support the components shown in FIG. 2 and/or other items. In some scenarios, the platform 236 comprises a deck or a bed with a single support surface or multiple support surfaces separated by dividers (e.g., bins, shelves or drawers). Devices (e.g., aerators 130 of FIG. 1) can be placed on or removed from the platform 236 via the manipulator(s) 234. The manipulator(s) 234 are also used to place devices (e.g., aerators 130 of FIG. 1) and/or other items at strategic locations within an area of interest. In this regard, the manipulator(s) 234 are generally configured to grasp or otherwise hold the devices (e.g., aerators 130 of FIG. 1) and/or other items.

The NDF system 230 of UAAV 112 is generally configured to move the HAUCS sensing platform 102 within a surrounding environment without coming in contact with obstructions and without tipping over. In this regard, the NDF system 230 includes, but is not limited to, an air based propulsion system, a water based propulsion system, a drive train, drive wheels, tracks (such as those found on tanks), and/or a GPS guidance system. The NDF system 230 is configured to continuously determine and track the UMM's position and location relative to other objects within a surrounding environment. NDF systems are well known in the art, and therefore will not be described in detail herein. Any known or to be known NDF system can be used herein without limitation. In some scenarios, beacons and/or RFID tags are used by the NDF system 230 to track the UAAV's location within a given area. Additionally or alternatively, the NDF system 230 uses other techniques (e.g., triangulation) to track the UAAV's location.

The UAAV 112 is not limited to the architecture shown in FIG. 2. The UAAV 112 may include more or fewer components than shown in FIG. 2. For example, the UAAV 112 can include Light Detection And Ranging ("LIDAR") devices and/or hyperspectral imaging devices for further facilitating the generation of accurate relative distance and direction information. LIDAR devices and/or hyperspectral imaging devices are well known in the art, and therefore will not be described herein. Any known or to be known LIDAR device(s) and/or hyperspectral imaging device(s) can be used herein without limitation.

The UAAV 112 may also include lights 276. The lights 276 can include, but are not limited to camera lights, light emitting diodes, spot lights, and/or navigation lights. Each of the listed lights are well known in the art, and therefore will not be described herein. The lights 276 can be selected in accordance with a given application and/or in accordance with applicable regulations.

Figure 3:
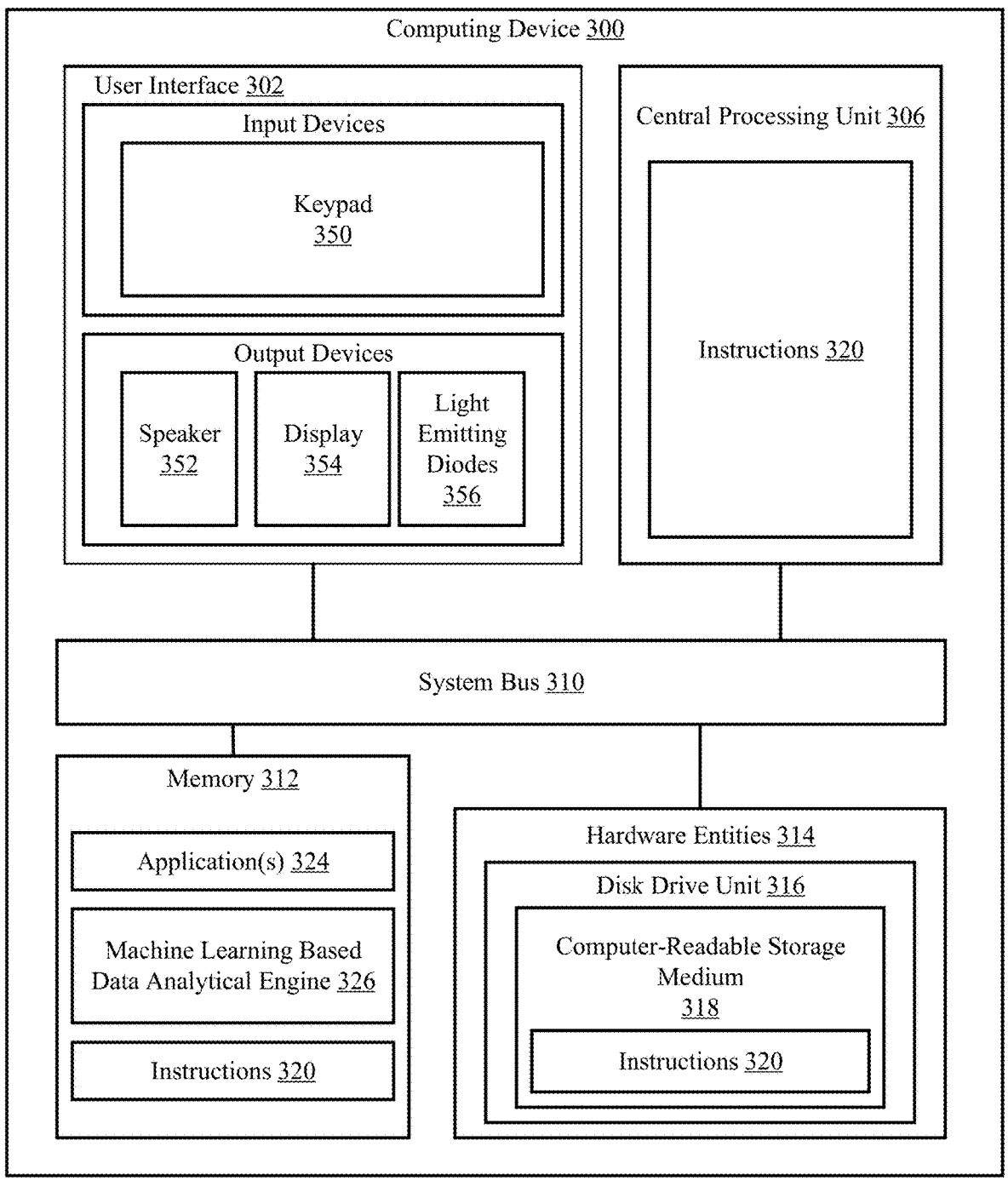
FIG. 3 is an illustration of an illustrative architecture for a computing device.

Referring now to FIG. 3, there is provided a detailed block diagram of an illustrative architecture for a computing device 300. Computing device(s) 108, 116 of FIG. 1 and/or computing device 232 of FIG. 2 is(are) the same as or substantially similar to computing device 300. As such, the following discussion of computing device 300 is sufficient for understanding computing device(s) 108 and 116 of FIG. 1 and/or computing device 232 of FIG. 2.

Computing device 300 may include more or fewer components than those shown in FIG. 3. However, the components shown are sufficient to disclose an illustrative embodiment implementing the present solution. The hardware architecture of FIG. 3 represents one embodiment of a representative computing device configured to facilitate the mitigation of emergency situations and/or the optimization of the yield of farmed fish or other animals. As such, computing device 300 of FIG. 3 implements at least a portion of the methods described herein.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300. In some scenarios, the CPU 306 additionally or alternatively includes a Graphical Processing Unit ("GPU").

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating the mitigation of emergency situations and/or the optimization of the yield of farmed fish or other animals. In this regard, it should be understood that the electronic circuit can access and run application(s) 324 installed on the computing device 300. The software application(s) 324 is(are) generally operative to facilitate: the training of a prediction model for a machine learning based data analytical algorithm; the planning of missions for HAUCS sensing platforms 102, 132 of FIG. 1 based on the prediction model; the simulations of the planned missions and corresponding operations to be performed by the HAUCS sensing platforms 102, 132 of FIG. 1; the verification, approval and/or authorization of the planned missions; the remote control or programming of the HAUCS sensing platforms 102, 132 of FIG. 1 to implement the planned missions; the reception of sensor data from the HAUCS sensing platforms 102, 132 of FIG. 1; the analysis of the sensor data to accurately predict water quality variation; the detection of emergency situations; the emergency notifications; and/or the performance of remedial measures in emergency situations. Other functions of the software application 324 will become apparent as the discussion progresses.

The software application(s) 324 may utilize a machine learning based data analytical engine 326. The engine 326 may employ a recurrent neural network ("RNN"). The RNN can include, but is not limited to, a long-short term memory ("LSTM") model that preserves long-range dependencies in time series prediction. The LSTM model does not operate satisfactorily when there is incomplete data (i.e., gaps in the time series data). Incomplete data or missing data can be expected to frequently occur in the field due to interferences from various sources.

As such, a novel approach is adopted herein to train a feed-forward neural network to learn the D.O. variation trend of the body(ies) of water 122 and to predict the missing values. The LSTM network is trained using the fused dataset. Also, a bias is introduced in the LSTM model to reduce false negatives (e.g., the predicted D.O. level is higher than the actual D.O. level).

Figure 4:
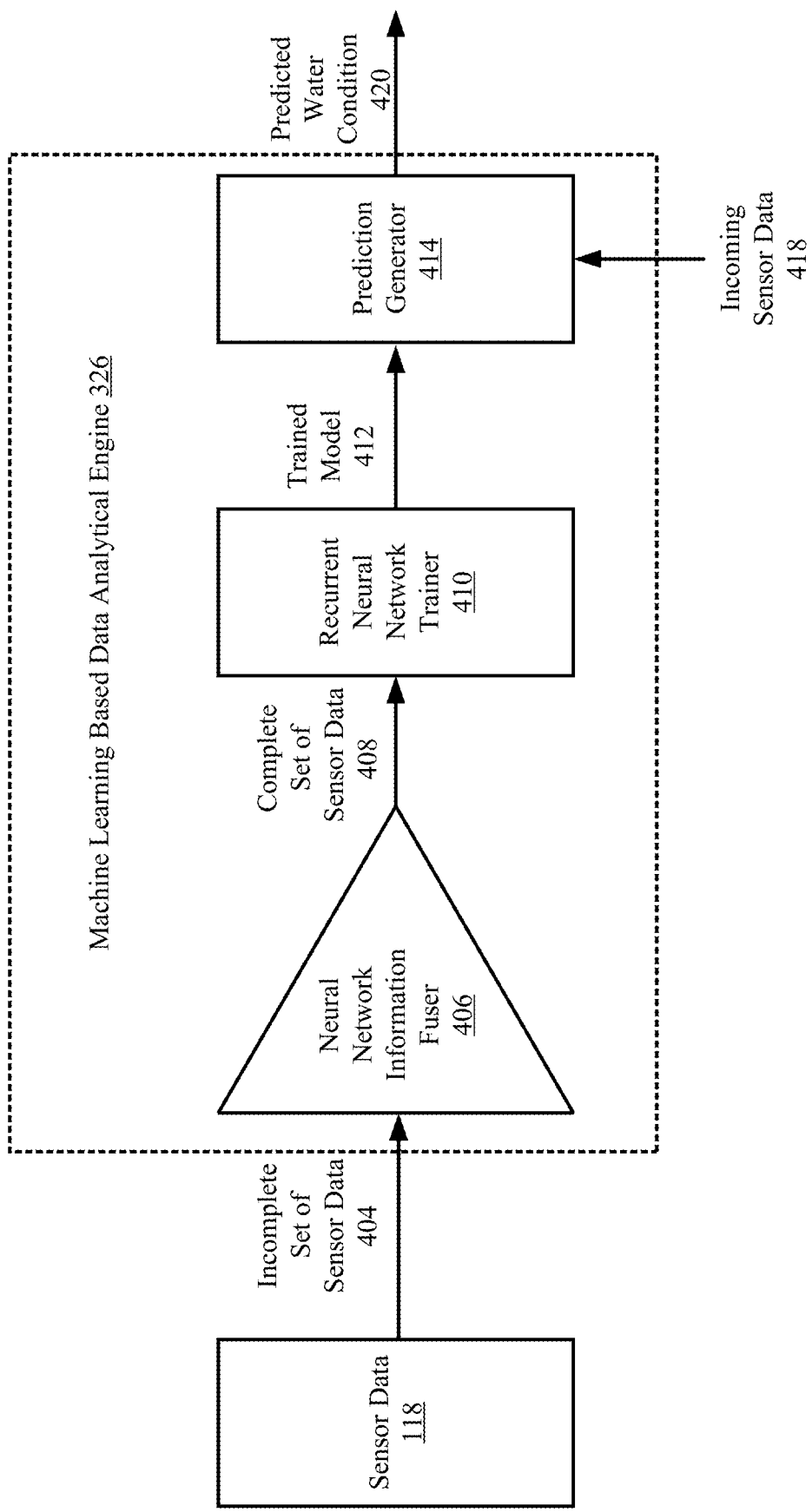
FIG. 4 provides an illustration that is useful for understanding operations of a machine learning based data analytical engine.

A functional block diagram is provided in FIG. 4 that is useful for understanding the operations of the machine learning based data analytical engine 326. As shown in FIG. 4, the machine learning based data analytical engine 326 accesses historical sensor data 118 stored in the datastore 110 of FIG. 1. The historical sensor data 118 is incomplete. As such, an incomplete set of sensor data 404 is provided to the machine learning based data analytical engine 326.

As shown in FIG. 4, the machine learning based data analytical engine 326 comprises a neural network information fuser 406, an RNN trainer 410, and a prediction generator 414. The neural network information fuser 406 receives an incomplete set of sensor data 404, generated missing sensor data value(s), and generates a complete set of sensor data 408 by combining the missing sensor data value(s) with the incomplete set of sensor data 404. The manner in which the missing sensor data value(s) are generated will be described below in relation to FIG. 5. The complete set of sensor data 408 is then provided to the RNN trainer 410.

The RNN trainer 410 trains the RNN using the complete set of sensor data 408 in a body of water by body of water (e.g., pond by pond) manner. A bias is introduced in the model training to reduce false negatives (e.g., a predicted D.O. level is higher or lower than an actual D.O. level). Specifically, the bias is introduced using a target function. The target function generates a prediction error regularized by an L2 norm of all trainable weights, as shown by the following mathematical equation (1).

$$\Sigma_{t=1}^{T}\|y-\hat{y}_t\|+\alpha\|y'-\hat{y}'_t\|+\beta\|W\|_2 \quad (1)$$

Where: y and $\hat{y}$ are the predicted values and ground truth at time t; y' and $\hat{y}'_t$ are the predicted values and the ground truth of the training samples with false-negatives at time t; W denotes the weights of all neural networks in the proposed model; α is the penalty factor for a false negative; and β is the neural network weights regularization parameter. Given the training dataset, the neural network weights can be optimized through minimization of the target function. The model can be trained offline, separated from normal farm control operations. The model can alternatively be trained online with new sensor measurements and weather data.

The trained model 412 is then used by the prediction generator 414 to predict the status of a body of water using the sensor data from the HAUCS sensing platform(s) 102 and other environmental data. The environmental data can include, but is not limited to, temperature data, wind speed data, and/or wind direction data. The environmental data can be obtained from weather reposts 150 and/or weather stations 152 of FIG. 1.

Figure 5:
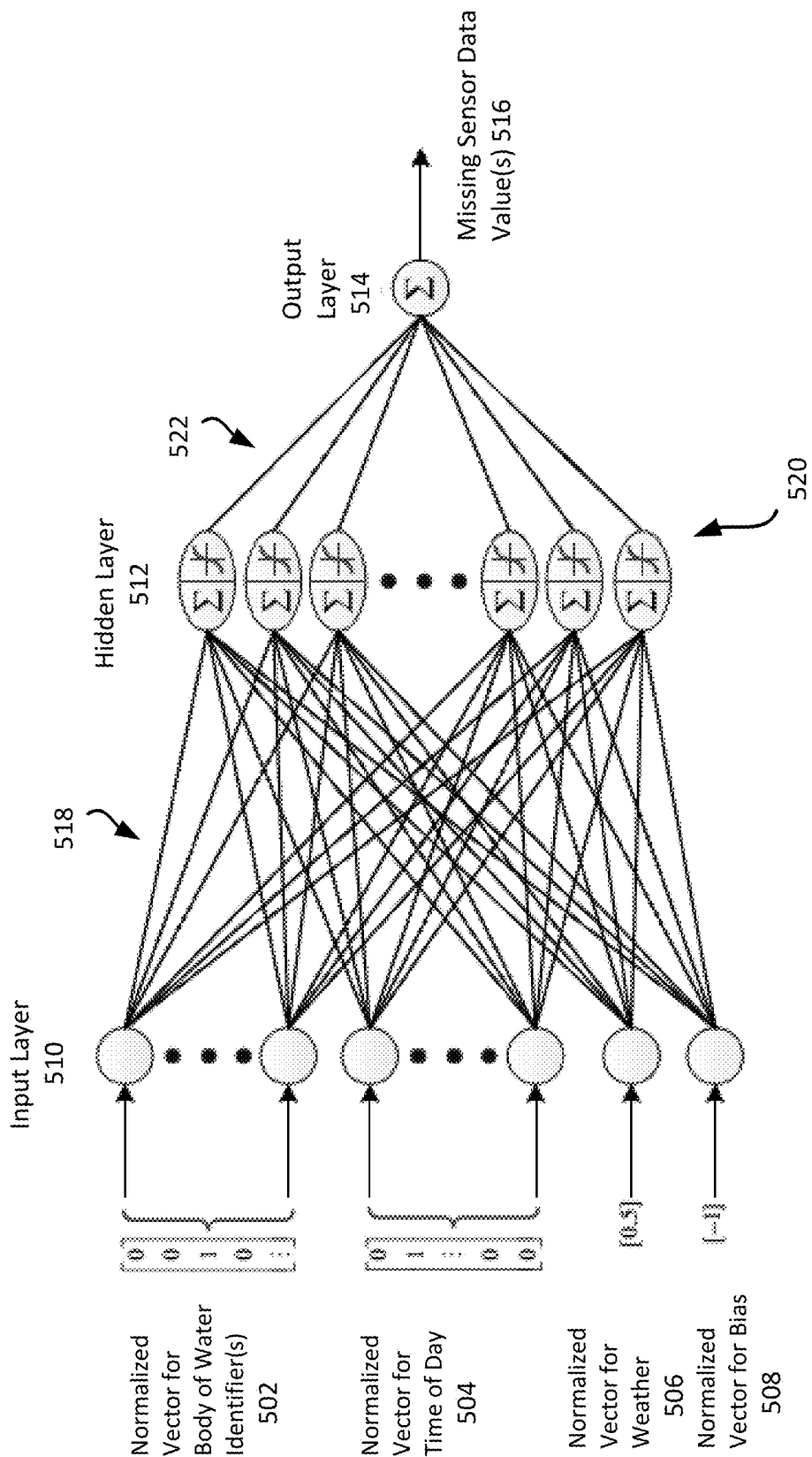
FIG. 5 provides an illustration that is useful for understanding operations of the neural network information fuser of FIG. 4.

An illustration that is useful for understanding how the neural network information fuser 406 predicts the missing sensor data values is provided in FIG. 5. As shown in FIG. 5, various information is input to the prediction generator 414. This input information includes a normalized vector 502 for body of water identifier(s), a normalized vector 504 for time of day, a normalized vector 506 for weather, and a normalized vector 508 for bias. The numerical values of the normalized vectors 502, 504, 506, 508 are temporarily stored at the input layer 510 (e.g., in a buffer or other memory device) of the machine learning based data analytical engine 326. Thereafter, the numerical values are then communicated from an input layer 510 to a hidden layer 512 in the feed-forward neural network model, as shown by lines 518.

The hidden layer 512 is constructed with sigmoid functions 520. Sigmoid functions are well known in the art, and therefore will not be described in detail herein. Generally, a sigmoid function is a mathematical function having a characteristic "S"-shaped curve or sigmoid curve. An illustrative sigmoid function is defined by the following mathematical equation (2).

$$S(x)=\frac{1}{1+e^{-x}}=\frac{e^x}{e^x+1} \quad (2)$$

The outputs of the hidden layer 512 are provided to the output layer 514 of the feed-forward neural network model, as shown by lines 522. The output layer 514 combines the outputs from the hidden layer 512 to produce a missing sensor data value 516 for a specific body of water 122 at a specific time of day. This process is repeated for all times of days that are associated with missing sensor data.

The effectiveness of the machine learning based data analytical engine 326 has been validated using a high temporal-resolution dataset from the HBOI Indian River Lagoon ("IRL") Land/Ocean Biogeochemical Observatory ("LOBO"). The LOBO comprises D.O. sensors that generate D.O. sensor data. The D.O. sensor data from August 2018 was used to validate the effectiveness of the machine learning based data analytical engine 326. The D.O. prediction results are shown in the graph of FIG. 6.

Figure 6A:
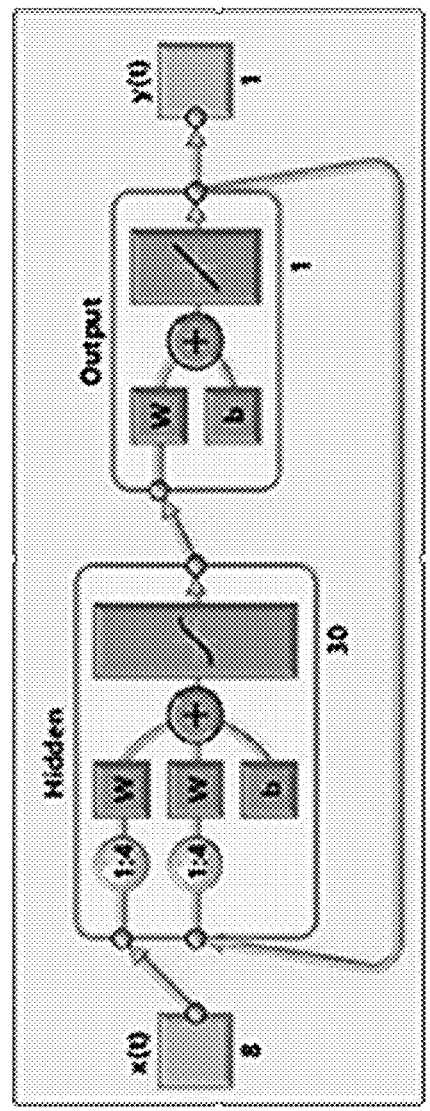
FIG. 6A provides an illustration of a Nonlinear Autoregressive Network with Exogenous Inputs ("NARX") model.
Figure 6B:
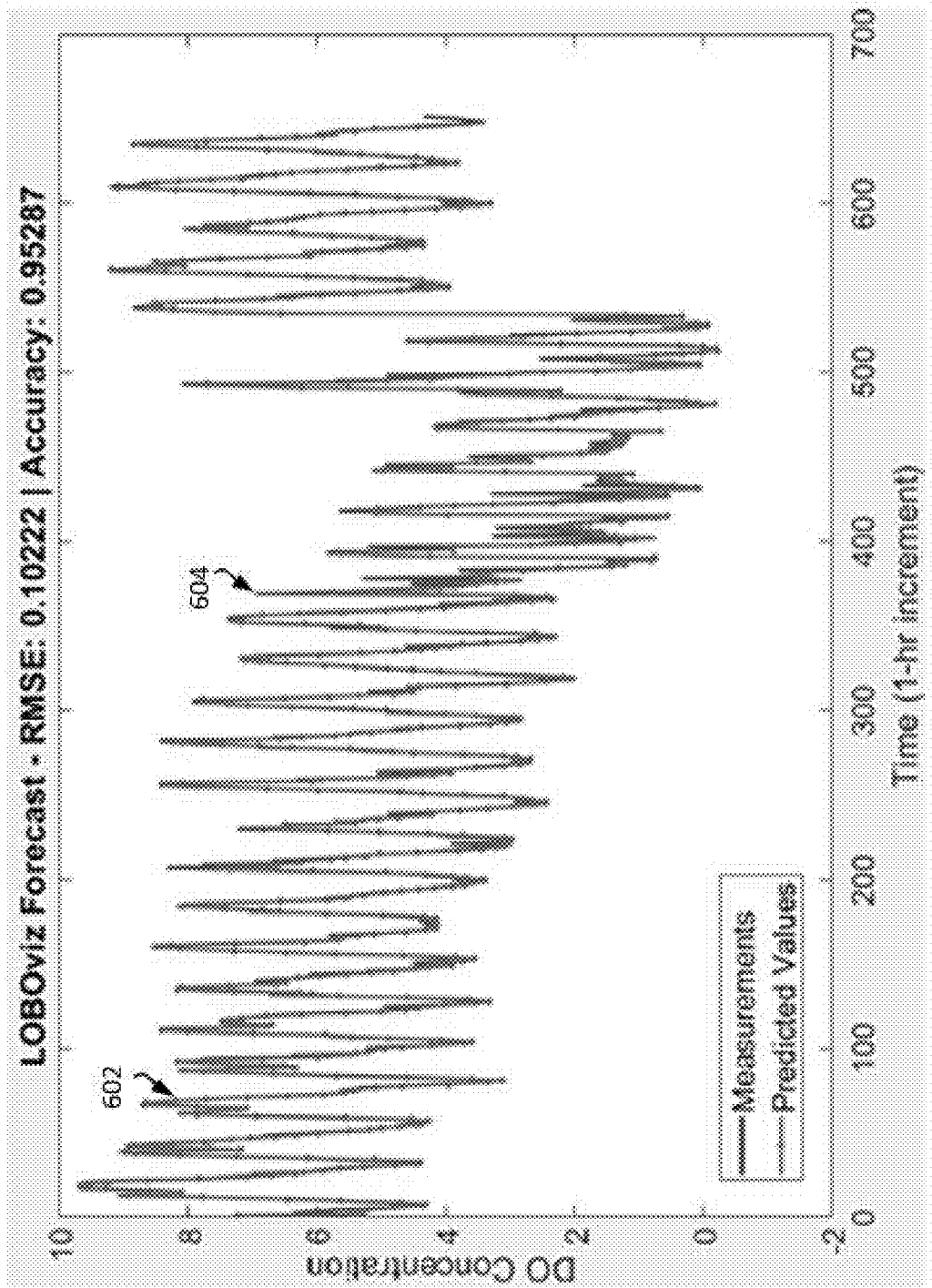
FIG. 6B provides a graph showing simulation results using the NARX model of FIG. 6A.

In FIG. 6B, curve 602 represents the model predictions at each point in time, and curve 604 represents actual measured data. It can be clearly observed from FIG. 6B that the prediction values match well with the actual measurement values, and the prediction results are stable. In the model, the algorithm has been tuned to bias the prediction towards a lower bound to avoid a false negative. FIG. 6A verifies the effectiveness by employing a penalty term to reduce the probability that the prediction is lower than the actual measurement data (i.e., predicting a normal D.O. level when the actual D.O. level will go below a threshold).

Figure 7:
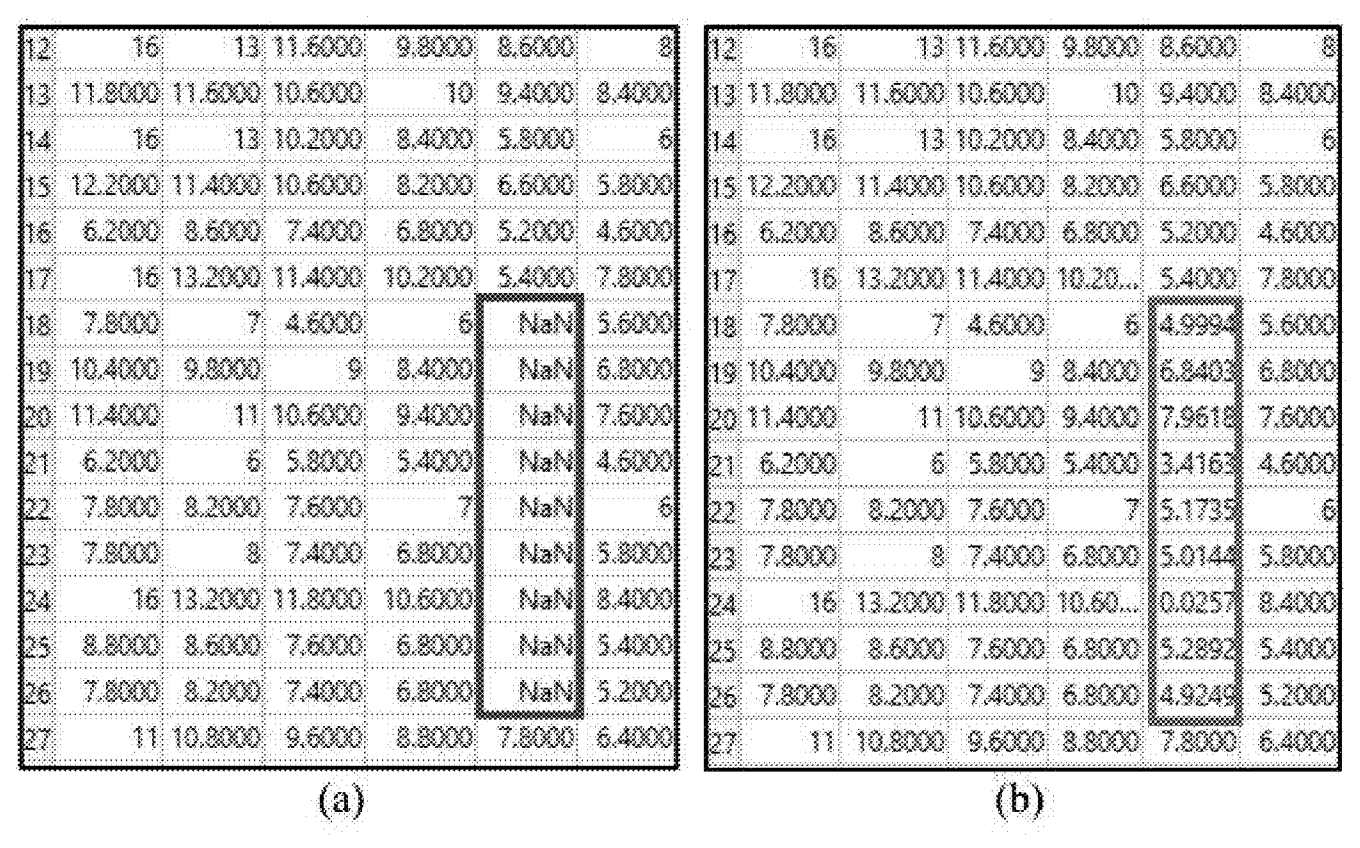

The machine learning based prediction model was then applied to a fish pond development dataset, which consists of D.O. data manually collected from 70 ponds for a month. FIG. 7 demonstrates the missing D.O. value predictions using the proposed structure based on a multilayer FNN. Specifically, FIG. 7(a) shows the collected measurements, where "NaN" represents a missing value in the raw data, and FIG. 7(b) shows the complete data that can be used for RNN training and prediction.

To quantify the model performance, the root-mean-squared error (RMSE) and the mean absolute percentage error (MAPE) are used as shown in the following mathematical equations (3) and (4).

$$RMSE = \sqrt{\frac{1}{N}\sum_{i=1}^{N}(y_i - \hat{y}_i)^2} \qquad (3)$$

$$MAPE = \frac{1}{N}\sum_{i=1}^{N}\left|\frac{y_i - \hat{y}_i}{y_i}\right| \qquad (4)$$

where $y_i$ and $\hat{y}_i$ are observed and preducted data, respectively. N is the total number of predictions. All the respective time series data sets are scaled into the rage of [0, 1] to be used for signmoid units in the neural network and RNN models.

Figure 8:
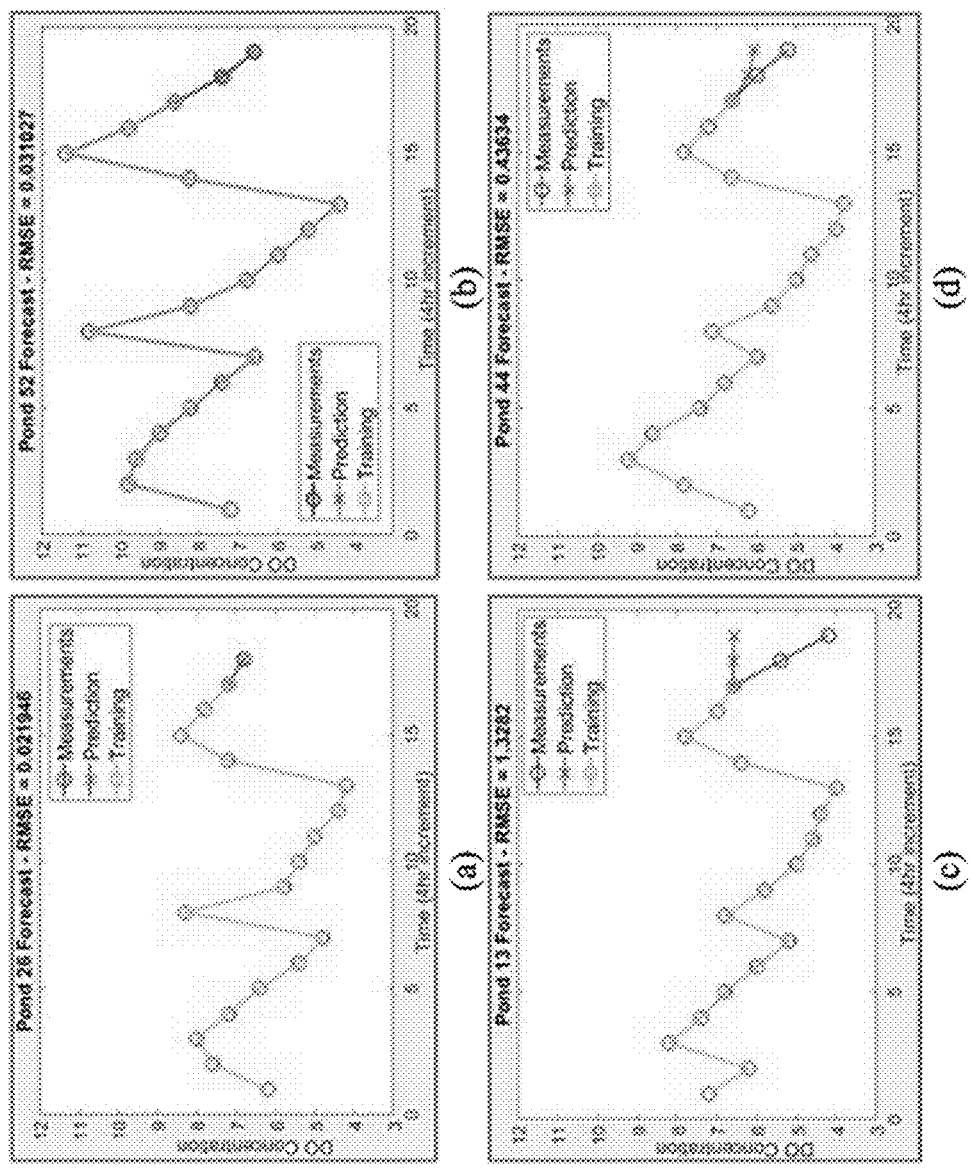
FIGS. 8(a)-8(d) (collectively referred to as "FIG. 8") provides graphs showing a detailed performance of a prediction model for four ponds.

The D.O. prediction performances of two typical ponds are shown in FIG. 8. The results of a first pond and a second pond (see FIGS. 8(a) and 8(b)) showed very effective and accurate predictions, where the RMSE values were very low. It is worth noting that the predictions for the first pond (see FIG. 8(a)) were four-hour-look-ahead and the predictions for the second pond (see FIG. 8(b)) were eight-hour-look-ahead.

Figure 9:
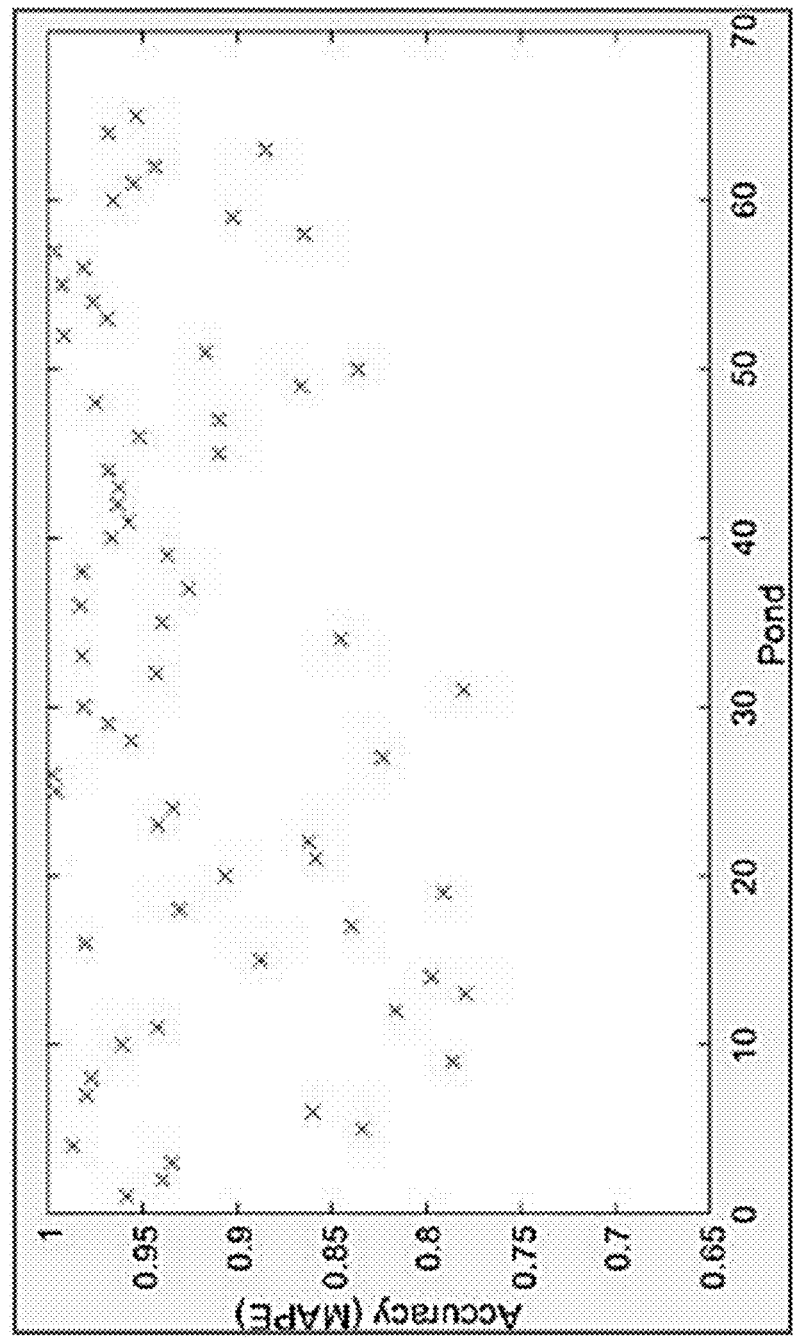
FIG. 9 provides a graph showing a performance of a prediction model for 4-hour-look-ahead of the ponds referenced in FIG. 8.

The four-hour-look-ahead MAPE of all the ponds is shown in FIG. 9. The prediction accuracy of the worst pond was 78%. The average accuracy was 92%. The accuracy achieved with the prediction model is unmatched from the current empirical formula based technique.

Figure 10A:
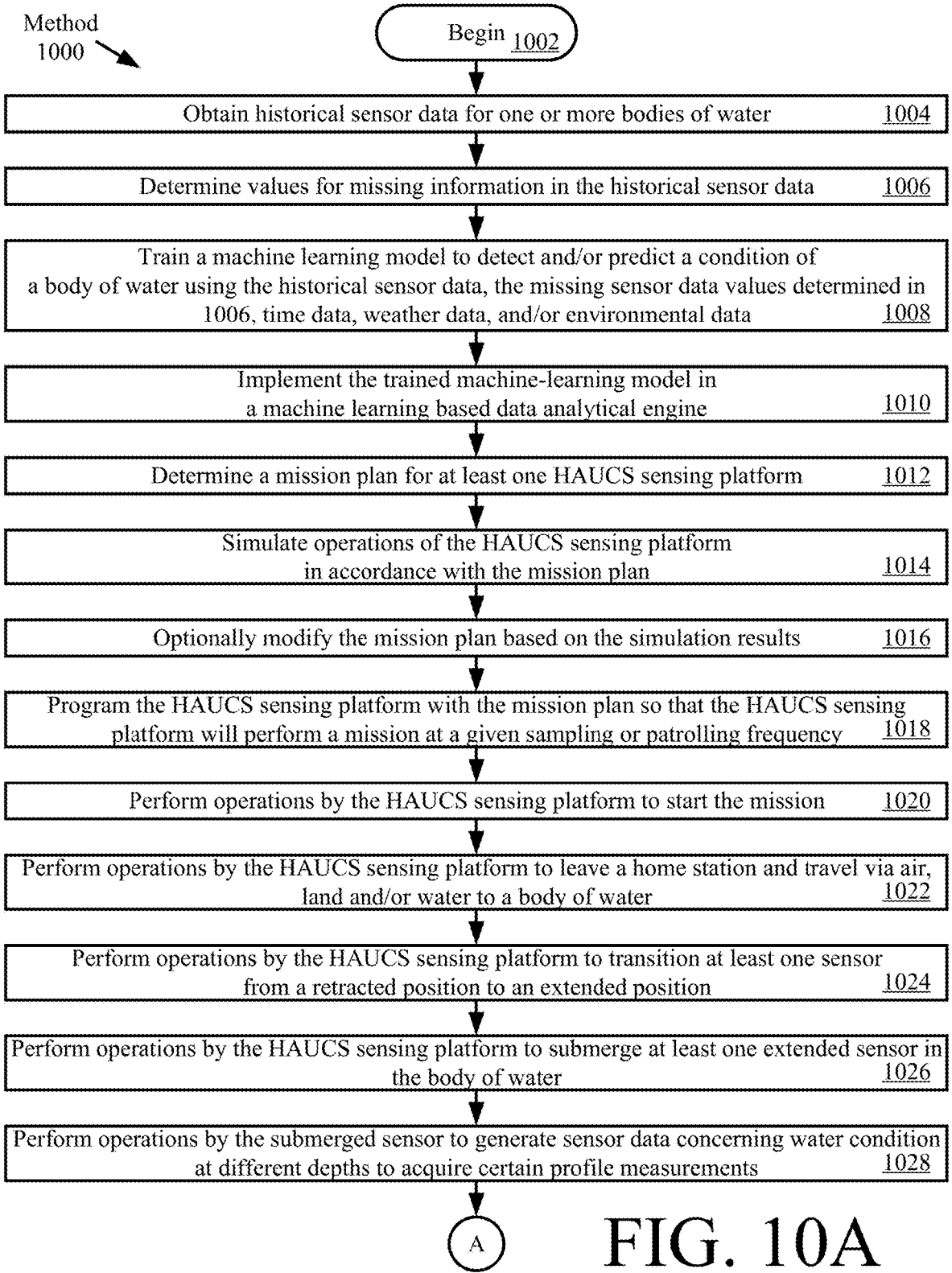
Figure 10B:
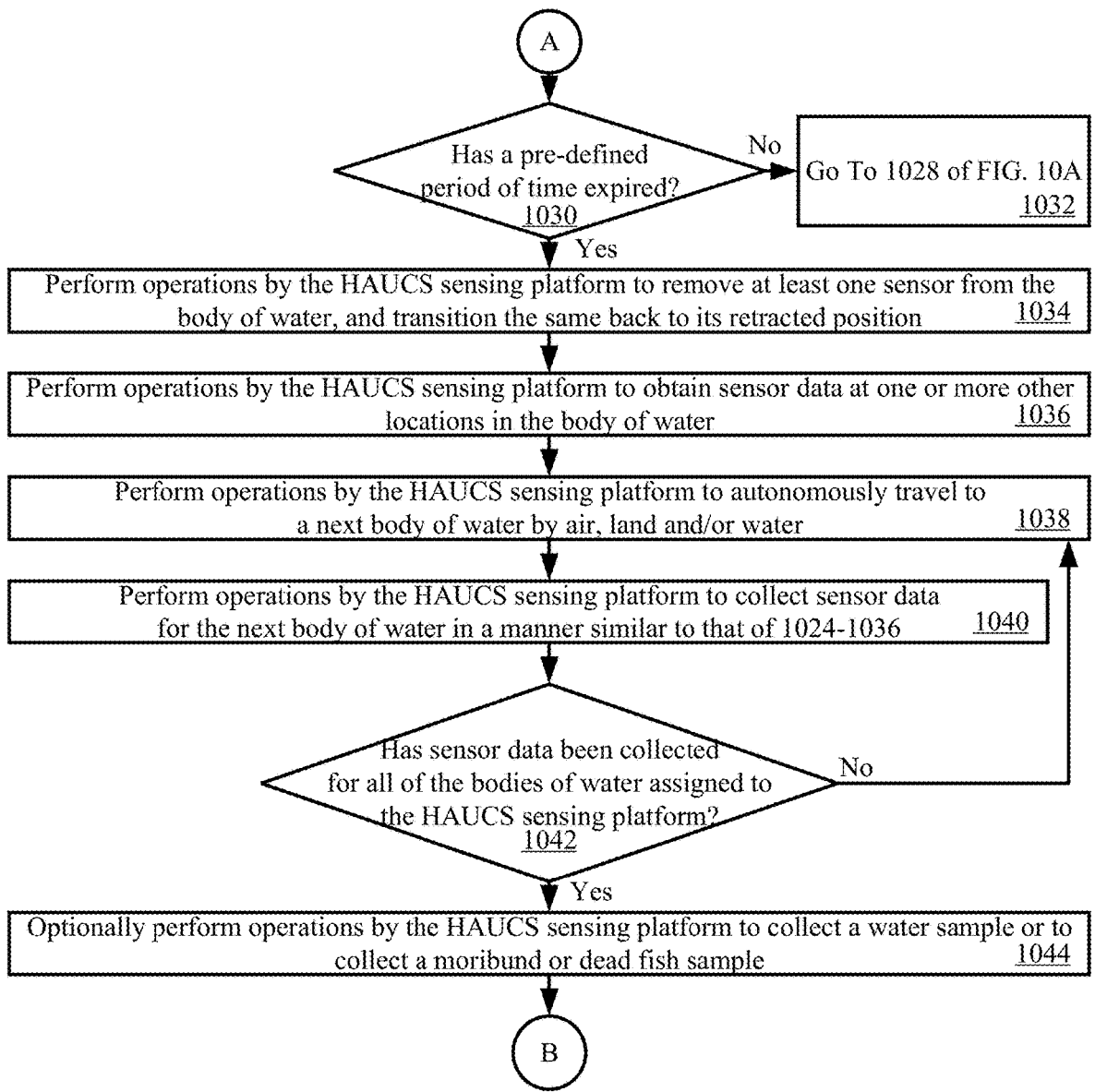
Figure 10C:
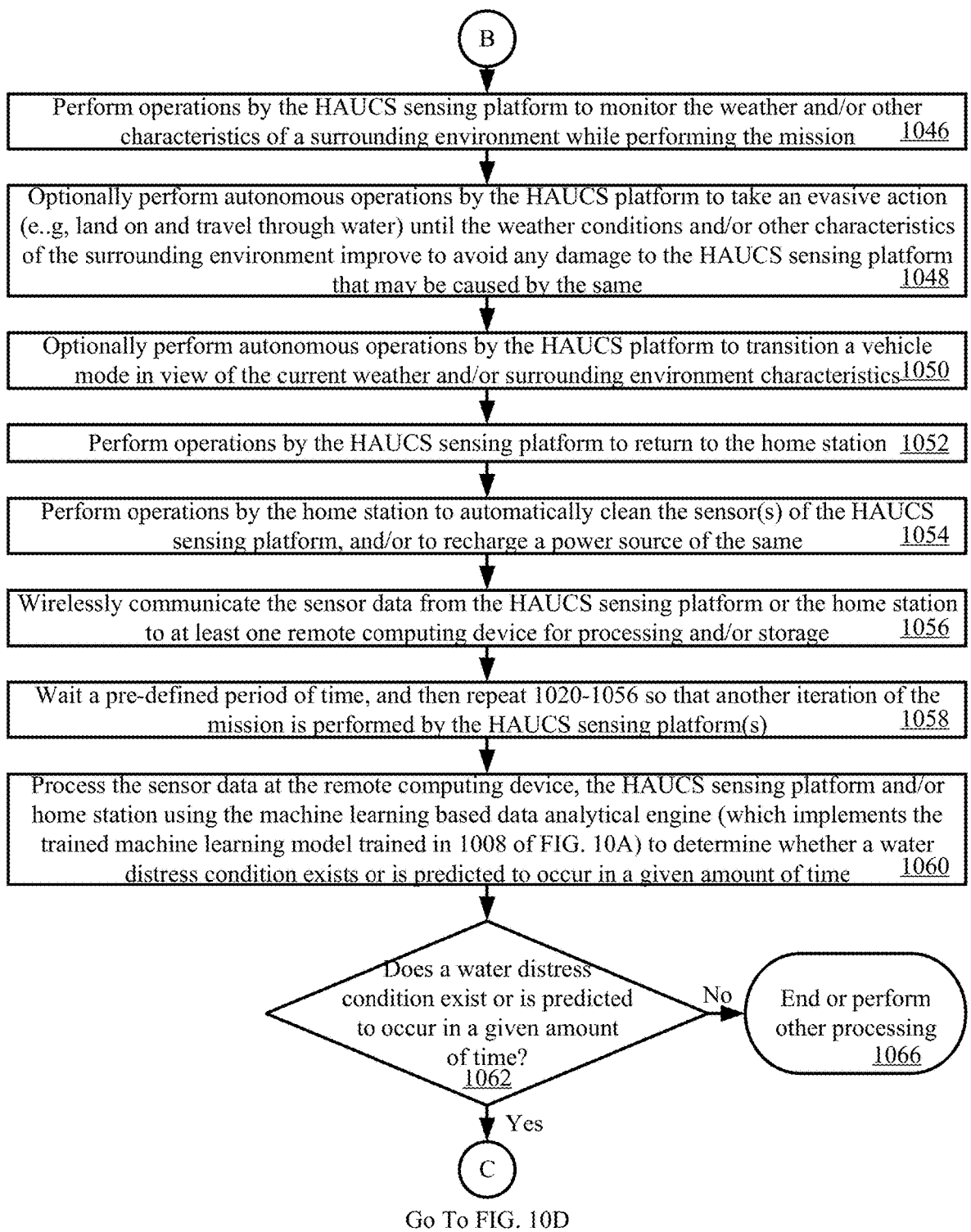

Referring now to FIG. 10, there is provided a flow diagram of an illustrative method 1000 for operating a system (e.g., system 100 of FIG. 1) including HAUCS sensing platforms (e.g., HAUCS sensing platform(s) 102 of FIG. 1). Method 1000 includes various operations 1002-1088. Operations 1002-1088 can be performed in the same or different order as shown in FIG. 10. For example, sensor data can be periodically communicated, continuously communicated and/or communicated in real time from the HAUCS sensing platform(s) during a mission. Alternatively or additionally, the sensor data can be communicated from the HAUCS sensing platform when it is docked at a home station (e.g., home station 128 of FIG. 1), as shown in FIG. 10C.

Referring now to FIG. 10A, method 1000 begins with 1002 and continues with 1004, where historical sensor data (e.g., sensor data 118 of FIG. 1) is obtained for one or more bodies of water (e.g., bodies of water 122 of FIG. 1). In 1006, values are determined for missing information in the historical sensor data. These values can be determined in the same or similar manner as that discussed above in relation to FIGS. 4-5. Next, a machine learning model is trained in 1008 to predict a condition of a body of water. The training is achieved using the historical sensor data obtained in 1004, the values determined in 1006, time data (e.g., timestamp information or clock information), weather data, and/or environmental data. The trained machine-learning model is then implemented in a machine learning based data analytical engine (e.g., machine learning based data analytical engine 326 of FIG. 3), as shown by 1010.

In 1012, a mission plan is determined for at least one HAUCS sensing platform (e.g., HAUCS sensing platform(s) 102 of FIG. 1). Techniques for determining mission plans for unmanned vehicles are well known in the art, and therefore will not be described herein. Any known or to be known technique for determining mission plans for unmanned vehicles can be used herein. In 1014, operations of the HAUCS sensing platform are simulated in accordance with the mission plan. Techniques for simulating mission plans of unmanned vehicles are well known in the art, and therefore will not be described herein. Any known or to be known technique for simulating mission plans for unmanned vehicles can be used herein. In 1016, the mission plan is optionally modified based on the simulation results. The HAUCS sensing platform is programmed in 1018 with the mission plan so that the HAUCS sensing platform will perform a mission at a given sampling or patrolling frequency. 1012-1018 may be performed by one or more computing devices (e.g., computing device 108 and/or 116 of FIG. 1) which are remote from the HAUCS sensing platform.

In 1020, the HAUCS sensing platform performs operations to start the mission. Accordingly in 1022, the HAUCS sensing platform leaves a home station (e.g., home station 128 of FIG. 1), and travels via air, land and/or water to a body of water (e.g., body of water 122 of FIG. 1). When the HAUCS sensing platform has reached a particular location of the body of water, it performs operations in 1024 to transition at least one sensor (e.g., sensor(s) 114 of FIG. 1) from a retracted position to an extended position. Techniques for transitioning mechanical and/or electro-mechanical devices from retracted to extended positions are well known in the art, and therefore will not be described herein. Next, 1028 is performed where the extended sensor(s) is(are) submerged in the body of water. Notably, the sensor(s) can be submerged in the body of water during 1024, i.e., while it is being transitioned from its retracted position to its extended position. In this case, method 1000 would be absent of 1026. The submerged sensor(s) then perform operations in 1028 to generate sensor data concerning water conditions at different depths to acquire certain profile measurements. Upon completing 1028, method 1000 continues with 1030 of FIG. 10B.

As shown in FIG. 10B, 1030 involves determining whether a pre-defined period of time (e.g., 30 seconds) has expired. If not [1030: NO], then method 1000 goes to 1028 of FIG. 10A, as shown by 1032. If so [1030: YES], then method 1000 goes to 1034 where the HAUCS sensing platform performs operations to remove the sensor(s) from the body of water, and transition the same back to the retracted position. Techniques for transitioning mechanical and/or electro-mechanical devices from extended to retracted positions are well known in the art, and therefore will not be described herein.

In 1036, the HAUCS sensing platform performs operations to obtain sensor data at one or more other locations in the body of water. These operations can include: traveling from a given location of the body of water to a different location of the body of water via air, land and/or water in accordance with the mission plan; and repeating the operations of 1024-1034.

Upon completing 1036, method 1000 continues with 1038 where the HAUCS sensing platform autonomously travels to a next body of water by air, land and/or water. This autonomous traveling by the HAUCS sensing platform is achieved in some scenarios by a navigation, drive and flight system (e.g., system 230 of FIG. 2) using GPS location information generated by a location device (e.g., location device 274 of FIG. 2) and at least one map of an aquaculture farm (e.g., aquaculture farm 120) which is stored in memory (e.g., memory 204 of FIG. 2). When the HAUCS sensing platform reaches the next body of water, it then performs operations in 1040 to collect sensor data for the next body of water in a manner similar to that of 1024-1036.

In 1042, a determination is made as to whether sensor data has been collected for all the bodies of water assigned to the HAUCS sensing platform. If not [1042: NO], then method 1000 returns to 1038. If so [1042: YES], then method 1000 continues with optional 1044 or 1046 of FIG. 10C. In 1044, the HAUCS sensing platform optionally collects a water sample or collects a moribund or dead fish sample. The collection can be achieved using a manipulator (e.g., manipulator 234 of FIG. 2) of the HAUCS sensing platform. For example, a sample is collected using an articulating or telescoping arm with a gripper on its free end. Notably, the HAUCS sensing platform may return to the home station when such a collection is made, and then returns to the field once the collected sample(s) has(have) been disposed of at the home station.

In 1046 of FIG. 10C, the HAUCS sensing platform monitors the weather and/or other characteristics of a surrounding environment while performing the mission. When bad weather is detected or the surrounding environment has a certain characteristic, the HAUCS sensing platform may optionally autonomously take one or more evasive actions in 1048 until the weather and/or characteristic improves or otherwise changes in accordance with a given criteria. The evasive actions can include, but are not limited to, landing on water, traveling on a surface of water, and/or traveling through water below its surface.

In optional 1050, the HAUCS sensing platform autonomously transitions its vehicle mode in view of the current weather and/or surrounding environment conditions. For example, the HAUCS sensing platform transitions from an aerial vehicle mode to an unmanned terrain vehicle mode, a sailing mode, a kite mode, or a submarine mode. The HAUCS sensing platform travels in the air as a plane or copter while in the aerial vehicle mode, and as a glider while in a kite mode. The HAUCS sensing platform travels in the water as a boat while in the sailing mode, and as a submarine while in the submarine mode. The present solution is not limited to the particulars of this example. The HAUCS sensing platform can transition back to the original vehicle mode (e.g., the aerial vehicle mode) when the weather and/or surrounding environment conditions improve or otherwise change in accordance with a given criteria.

In 1052, the HAUCS sensing platform returns to the home station. The home station performs operations in 1054 to clear the sensor(s) of the HAUCS sensing platform and/or to recharge a power source (e.g., power source 212 of FIG. 2). Methods for cleaning sensors and/or recharging power sources are well known in the art, and therefore will not be described herein.

One deficiency of the state-of-the-art buoy-based sensor stations is the lack of spatial coverage that can be achieved. Pond conditions may vary substantially at different locations in the same pond. Spatial and temporal variations of water quality parameters in three 0.4 hectare aquaculture ponds were investigated. It was concluded that locations within the pond were the highest source of variability. In particular, spatial locations contribute to 75% of the variance of Particulate Carbon ("PC"), Particulate Nitrogen ("PN"), and 35% of the variance of Total Dissolved Phosphorus ("TDP"). While DO was not tracked in this study, the result for TDP can be regarded as a proxy for DO due to the high correlation between TDP and DO. The contribution to the measurement variances from different locations can be expected to be even higher for large ponds (e.g., 2 to 8 hectares). This motivated the recent investigation of three dimensional short-term DO spatial distributions. A combination of fixed sensor installations and measurements using handheld sensors at various locations in one pond were utilized in this study.

Figure 12:
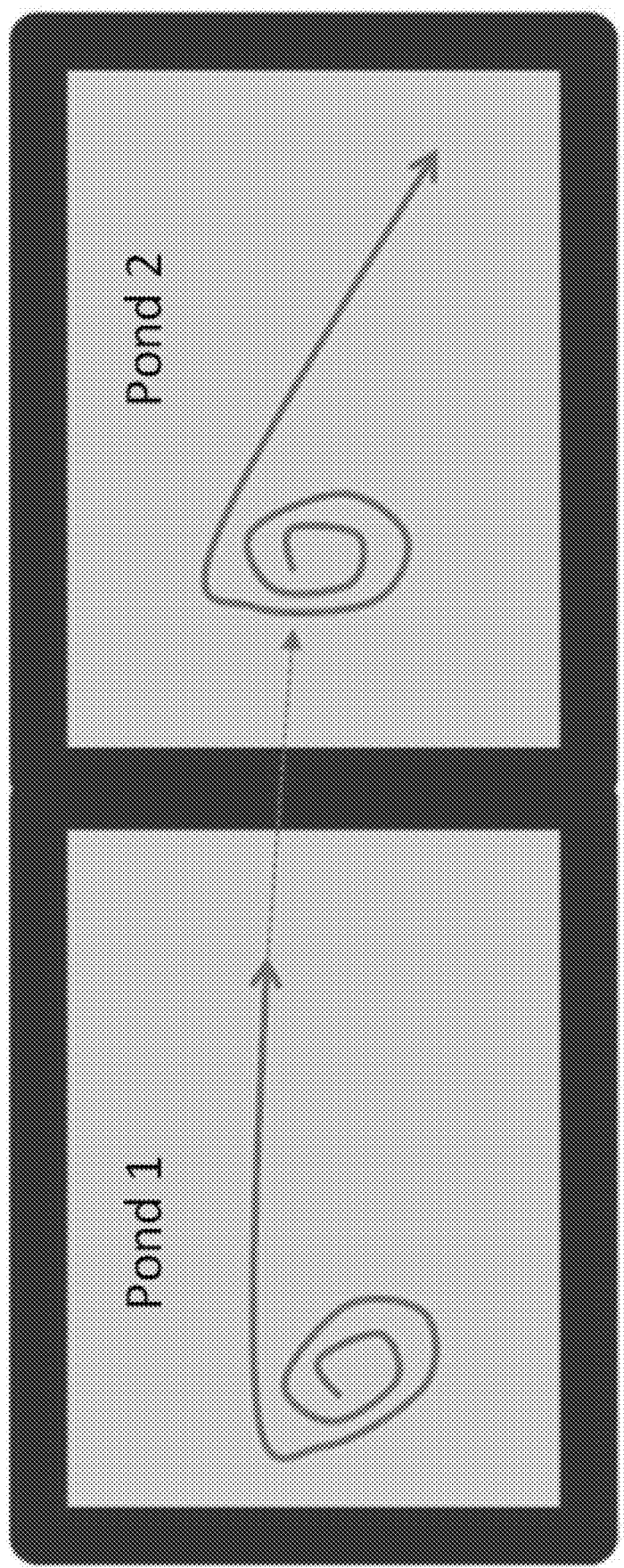
FIG. 12 provides an illustration of an illustrative mobile platform-based sensing scheme.

The HAUCS framework, for the first time, enables novel sensing schemes that cover extended spatial regions and provides more robust readings than traditional truck-based or the pond buoy-based data collection process. For example, to acquire the DO sensor data, the sensor needs to be in contact with the water body for about 30 seconds. One HAUCS platform-based sampling scheme is that when the platform first enters a new pond, the platform is stationary at one location for up to 30 seconds before moving through the pond toward an adjacent pond. During the whole process, the sensor stays in contact with the water body to collect a stream of water quality data (see FIG. 12). This sensing scheme is able to effectively use the transition time to acquire significantly more data samples and capture the spatial variability of water quality in a pond. Another advantage provided by the agility of the HAUCS sensing platform is that the sensing scheme (i.e., sampling patterns, frequencies, areas of focus, etc.) can be adaptive to the environmental conditions and the pond conditions. Such adaptations may be the results of the prediction model or the weather changes detected by the weather stations on the farm.

In some scenarios, sensor data is communicated from the HAUCS sensing platform or the home station to at least one remote computing device (e.g., computing device 108 and/or 116 of FIG. 1) for processing and/or storage, as shown by 1056. As noted above, this sensor data communication can occur while the HAUCS sensing platform is in the field performing the mission. Accordingly, the wireless communications of 1056 may be optionally performed when the HAUCS sensing platform is docked at the home station.

In 1058, the HAUCS sensing platform waits a predetermined period of time (e.g., 1 hour), and then repeats 1020-1056 so that another iteration of the mission is performed by the HAUCS sensing platform.

In 1060, the sensor data is processed at the remote computing device (e.g., remote computing device 108 and/or 116 of FIG. 1), the HAUCS sensing platform and/or the home station using the machine learning based data analytical engine (e.g., engine 326 of FIG. 3). As noted above, the machine learning based data analytical engine implements the machine learning model trained in 1008 of FIG. 10A. The sensor data is processed to determine whether a water distress condition exists or is predicted to occur in a given amount of time. If a determination is made that a water distress condition does not exist and/or is not predicted to occur in a given amount of time [1062: NO], then 1066 is performed where method 1000 ends or other processing is performed (e.g., return to 1002). In contrast, if a determination is made that a water distress condition does exist and/or is predicted to occur in a given amount of time [1062: YES], then method 1000 continues with 1068 of FIG. 10D.

As shown in FIG. 10D, 1068 involves modifying the mission plan of the HAUCS sensing platform so that it performs sensing operations in relation to its assigned bodies of water on a more frequent basis, i.e., the sampling or patrolling frequency of the HAUCS sensing platform is increased. In 1070, operations of at least one fixed instrument is optionally controlled to improve the water condition(s). For example, a wireless signal is sent from the HAUCS sensing platform, home station or remote computing device to the fixed instrument with a command to enable one or more operations thereof, disable one or more operations thereof, turn on system power, or turn off system power. The fixed instrument can include, but is not limited to, a fixed aerator (e.g., aerator 124 of FIG. 1), and/or a pre-deployed sensor. The pre-deployed sensor can include, but is not limited to, a dissolved oxygen sensor, a barometer, a temperature sensor, a humidity sensor, a wind speed sensor, a wind direction sensor, a rain sensor, a solar radiation sensor, a water pollution sensor, a water contaminant sensor, a water level sensor, a turbidity sensor, a pH sensor, a fungus detector, a parasite detector, a biological oxygen demand sensor, an oxidation reduction potential sensor, a colored dissolved organic matter sensor, a salinity/conductivity sensor, a camera, a microphone, a spectrographic sensor, a chlorophyll sensor, and/or a vibration sensor. Each of the listed sensors is well known in the art, and therefore will not be described herein.

In optional 1072, the HAUCS sensing platform and/or a human operator is caused to deploy a mobile instruction to one or more bodies of water. The mobile instrument can include, but is not limited to a mobile aerator (e.g., aerator 130 of FIG. 1), and/or a mobile sensor. The mobile sensor can include, but is not limited to, a dissolved oxygen sensor, a barometer, a temperature sensor, a humidity sensor, a wind speed sensor, a wind direction sensor, a rain sensor, a solar radiation sensor, a water pollution sensor, a water contaminant sensor, a water level sensor, a turbidity sensor, a pH sensor, a fungus detector, a parasite detector, a biological oxygen demand sensor, an oxidation reduction potential sensor, a colored dissolved organic matter sensor, a salinity/conductivity sensor, a camera, a microphone, a spectrographic sensor, a chlorophyll sensor, and/or a vibration sensor. Each of the listed sensors is well known in the art, and therefore will not be described herein.

Operations of the deployed mobile instrument are optionally controlled in 1074 to improve the water condition(s). For example, a wireless signal is sent from the HAUCS sensing platform, home station or remote computing device to the deployed mobile instrument with a command to enable one or more operations thereof, disable one or more operations thereof, turn on system power, or turn off system power.

In 1076, additional sensor data is received by the HAUCS sensing platform, home station and/or remote computing device. The additional sensor data is processed in 1078 by the HAUCS sensing platform, home station and/or remote computing device using the machine learning based data analytical engine (e.g., engine 326 of FIG. 3) to determine whether a water distress condition still exists or is still predicted to occur in a given amount of time. If a determination is made that a water distress condition still exists or is still predicted to occur in a given amount of time [1080: YES], then method 1000 returns to 1076. Otherwise [1080: NO], then 1082-1086 are performed.

1082-1086 involve: modifying the mission plan of the HAUCS sensing platform so that it performs sensing operations in relation to its assigned bodies of water on a less frequent basis (e.g., a sampling or patrolling frequency is decreased); optionally controlling operations of at least one fixed instrument and/or deployed mobile instrument to maintain water condition(s) (e.g., a wireless signal is sent from the HAUCS sensing platform, home station or remote computing device to the deployed mobile instrument with a command to enable one or more operations thereof, disable one or more operations thereof, turn on system power, or turn off system power); and/or causing the HAUCS sensing platform and/or a human operator to retrieve a mobile instrument from one or more bodies of water and bring it to the home station. Subsequently, 1088 is performed where method 1000 ends or other processing is performed.

Figure 11A:
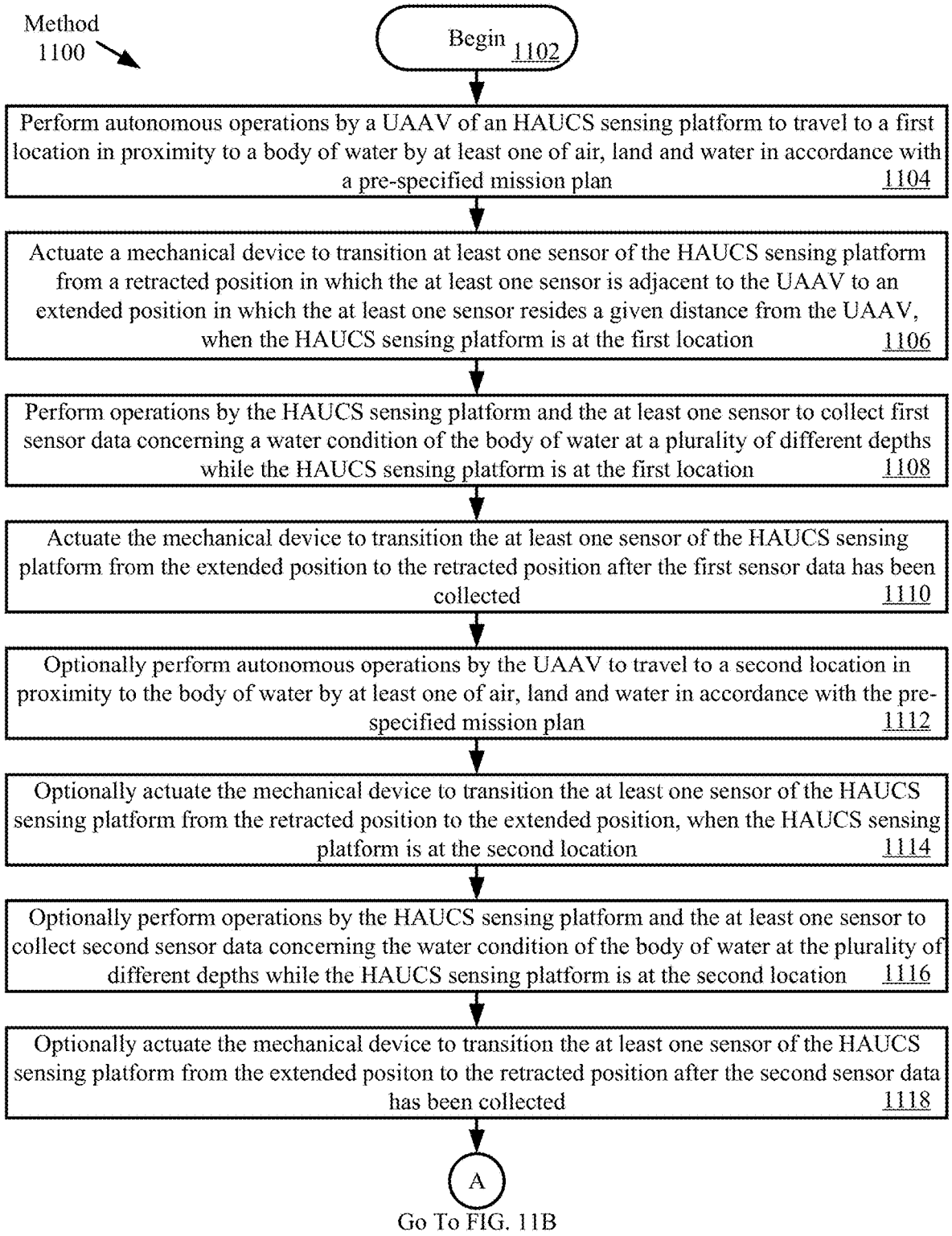

Referring now to FIG. 11, there is provided a flow diagram of an illustrative method 1100 for operating a system including at least one HAUCS sensing platform. The method 1100 begins with 1102 and continues with 1104-1110. 1104-1110 comprise: performing autonomous operations by a UAAV of the HAUCS sensing platform to travel to a first location in proximity to a body of water by at least one of air, land and water in accordance with a pre-specified mission plan; actuating a mechanical device (e.g., a telescoping boom, an articulating arm, a linkage with one or more joints, etc.) to transition at least one sensor of the HAUCS sensing platform from a retracted position in which the at least one sensor is adjacent to the UAAV to an extended position in which the at least one sensor resides a given distance from the UAAV, when the HAUCS sensing platform is at the first location; performing operations by the HAUCS sensing platform and the at least one sensor to collect first sensor data concerning a water condition of the body of water at a plurality of different depths while the HAUCS sensing platform is at the first location; actuating the mechanical device to transition the at least one sensor of the HAUCS sensing platform from the extended positon to the retracted position after the first sensor data has been collected.

Method 1100 may optionally comprise operations of 1112-1118. 1112-1118 comprise: performing autonomous operations by the UAAV to travel to a second location in proximity to the body of water by at least one of air, land and water in accordance with the pre-specified mission plan; actuating the mechanical device to transition the at least one sensor of the HAUCS sensing platform from the retracted position to the extended position, when the HAUCS sensing platform is at the second location; performing operations by the HAUCS sensing platform and the at least one sensor to collect second sensor data concerning the water condition of the body of water at the plurality of different depths while the HAUCS sensing platform is at the second location; and actuating the mechanical device to transition the at least one sensor of the HAUCS sensing platform from the extended positon to the retracted position after the second sensor data has been collected. Upon completing 1110 or 1118, method 1100 continues with 1120 of FIG. 11B.

Figure 11B:
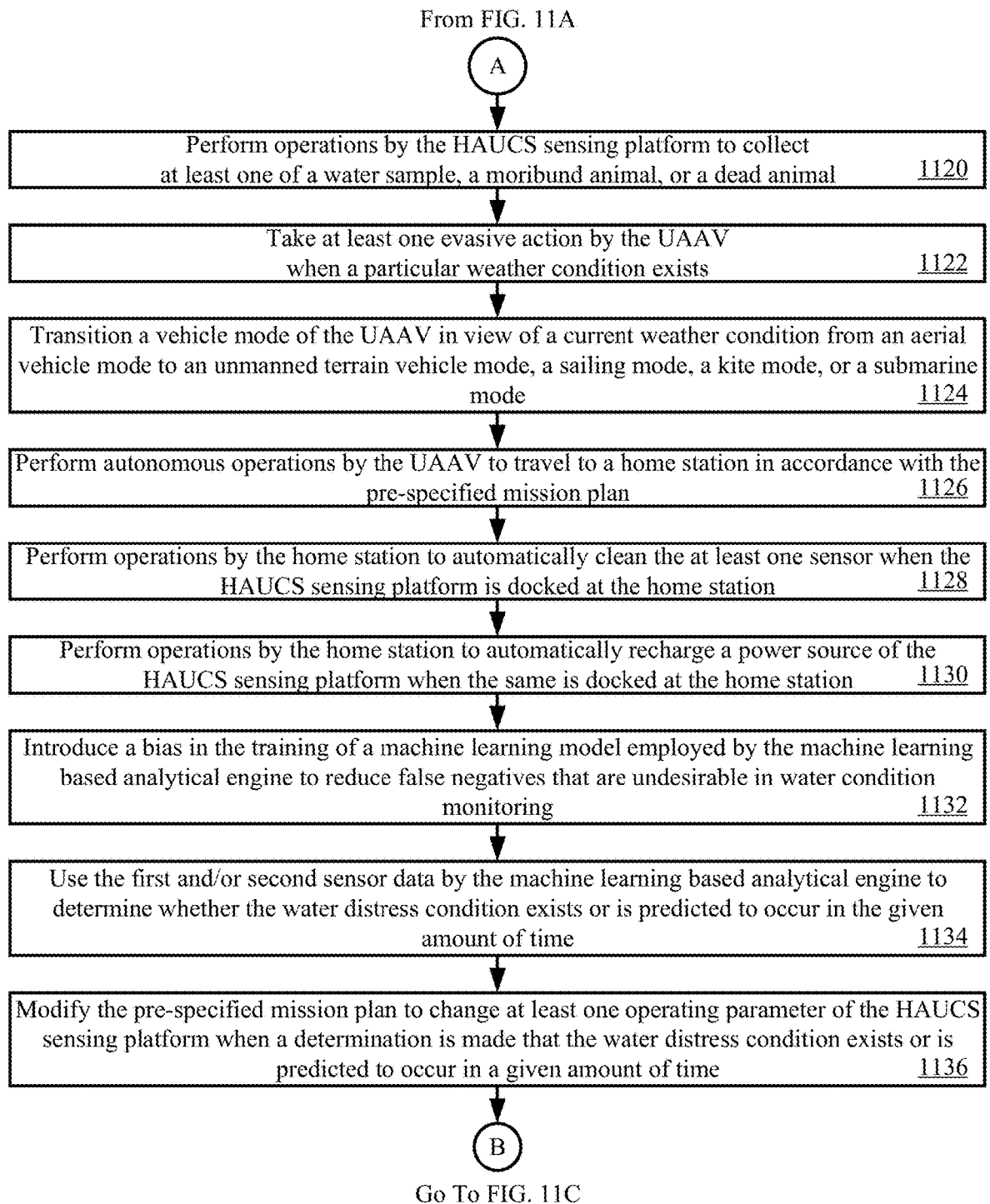

As shown in FIG. 11B, 1120 involves performing operations by the HAUCS sensing platform to collect at least one of a water sample, a moribund animal, or a dead animal. In 1122, at least one evasive action is taken by the UAAV when a particular weather condition exists. In 1124, a vehicle mode of the UAAV is transitioned in view of a current weather condition from an aerial vehicle mode to an unmanned terrain vehicle mode, a sailing mode, a kite mode, or a submarine mode.

In 1126, the UAAV performs autonomous operations to travel to a home station in accordance with the pre-specified mission plan. The home station performs operations to automatically clean the at least one sensor in 1128 when the HAUCS sensing platform is docked at the home station, and/or performs operations to automatically recharge a power source of the HAUCS sensing platform in 1130 when the HAUCS sensing platform is docked at the home station.

In 1132, a bias is introduced in a training of a machine learning model employed by the machine learning based analytical engine to reduce false negatives that are undesirable in water condition monitoring. In 1134, the first and/or second sensor data is used by a machine learning based analytical engine (that employs the trained machine learning model) to determine whether a water distress condition exists or is predicted to occur in a given amount of time. When a determination is made that the water distress condition exists or is predicted to occur in a given amount of time, the pre-specified mission plan is modified to change at least one operating parameter of the HAUCS sensing platform (e.g., a sampling or patrolling frequency), as shown by 1136. Upon completing 1136, method 1110 continues with optional 1138-1142 of FIG. 11C.

As shown in FIG. 11C, 1138-1142 involve optionally performing the following operations when a determination is made that the water distress condition exists or is predicted to occur in a given amount of time: controlling operations of at least one fixed instrument to improve the water condition of the body of water; causing the HAUCS sensing platform to autonomously deploy a mobile instrument to the body of water when a determination is made that the water distress condition exists or is predicted to occur in a given amount of time; and/or controlling operations of the mobile instrument to improve the water condition of the body of water once the mobile instrument has been deployed.

In 1144, the machine learning based analytical engine and additional sensor data are used to determine whether the water distress condition no longer exists or is no longer predicted to occur. The pre-specified mission plan is modified in 1146 to once again change the at least one operating parameter of the HAUCS sensing platform when a determination is made that the water distress condition no longer exists or is no longer predicted to occur. In 1148, operations of at least one fixed instrument are optionally controlled to maintain the water condition of the body of water. In 1150, the HAUCS sensing platform is optionally caused to autonomously retrieve a mobile instrument from the body of water when a determination is made that the water distress condition no longer exists or is no longer predicted to occur. Subsequently, 1152 is performed where method 1100 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim the following:

1. A method for operating a system including at least one Hybrid/Aerial Underwater Robotics System ("HAUCS") sensing platform, comprising:

performing autonomous operations by an Unmanned Aero-Amphibious Vehicle ("UAAV) of the HAUCS sensing platform to travel to a first location in proximity to a body of water by at least one of air, land and water in accordance with a pre-specified mission plan;

actuating a mechanical device to transition at least one sensor of the HAUCS sensing platform from a retracted position in which the at least one sensor is adjacent to the UAAV to an extended position in which the at least one sensor resides a given distance from the UAAV, when the HAUCS sensing platform is at the first location;

performing operations by the HAUCS sensing platform and the at least one sensor to collect first sensor data concerning a water condition of the body of water at a plurality of different depths while the HAUCS sensing platform is at the first location;

actuating the mechanical device to transition the at least one sensor of the HAUCS sensing platform from the extended positon to the retracted position after the first sensor data has been collected;

causing the first sensor data to be processed using a machine learning based analytical engine to determine whether a water distress condition exists or is predicted to occur in a given amount of time; and modifying the pre-specified mission plan to change at least one operating parameter of the HAUCS sensing platform when a determination is made that the water distress condition exists or is predicted to occur in a given amount of time.

2. The method according to claim 1, wherein the at least one operating parameter comprises (a) a sampling or patrolling frequency or (b) a sampling or patrolling pattern.

3. The method according to claim 1, further comprising:

performing autonomous operations by the UAAV to travel to a second location in proximity to the body of water by at least one of air, land and water in accordance with the pre-specified mission plan;

actuating the mechanical device to transition the at least one sensor of the HAUCS sensing platform from the retracted position to the extended position, when the HAUCS sensing platform is at the second location;

performing operations by the HAUCS sensing platform and the at least one sensor to collect second sensor data concerning the water condition of the body of water at the plurality of different depths while the HAUCS sensing platform is at the second location; and actuating the mechanical device to transition the at least one sensor of the HAUCS sensing platform from the extended positon to the retracted position after the second sensor data has been collected.

4. The method according to claim 3, wherein the second sensor data is additionally used by the machine learning based analytical engine to determine whether the water distress condition exists or is predicted to occur in the given amount of time.

5. The method according to claim 1, further comprising performing autonomous operations by the UAAV to travel to a home station in accordance with the pre-specified mission plan.

6. The method according to claim 5, further comprising performing operations by the home station to automatically clean the at least one sensor when the HAUCS sensing platform is docked at the home station.

7. The method according to claim 5, further comprising performing operations by the home station to automatically recharge a power source of the HAUCS sensing platform when the HAUCS sensing platform is docked at the home station.

8. The method according to claim 1, further comprising performing operations by the HAUCS sensing platform to collect at least one of a water sample, a moribund animal, or a dead animal.

9. The method according to claim 1, further comprising taking at least one evasive action by the UAAV when a particular weather condition exists.

10. The method according to claim 1, further comprising transitioning a vehicle mode of the UAAV in view of a current weather condition from an aerial vehicle mode to an unmanned terrain vehicle mode, a sailing mode, a kite mode, or a submarine mode.

11. The method according to claim 1, further comprising controlling operations of at least one fixed instrument to improve the water condition of the body of water, when a determination is made that the water distress condition exists or is predicted to occur in a given amount of time.

12. The method according to claim 1, further comprising causing the HAUCS sensing platform to autonomously deploy a mobile instrument to the body of water when a determination is made that the water distress condition exists or is predicted to occur in a given amount of time.

13. The method according to claim 12, further comprising controlling operations of the mobile instrument to improve the water condition of the body of water once the mobile instrument has been deployed.

14. The method according to claim 1, further comprising:
using the machine learning based analytical engine and additional sensor data to determine whether the water distress condition no longer exists or is no longer predicted to occur; and
modifying the pre-specified mission plan to once again change the at least one operating parameter of the HAUCS sensing platform when a determination is made that the water distress condition no longer exists or is no longer predicted to occur.

15. The method according to claim 14, further controlling operations of at least one fixed instrument to maintain the water condition of the body of water, when a determination is made that the water distress condition no longer exists or is no longer predicted to occur.

16. The method according to claim 14, further comprising causing the HAUCS sensing platform to autonomously retrieve a mobile instrument from the body of water when a determination is made that the water distress condition no longer exists or is no longer predicted to occur.

17. The method according to claim 1, further comprising introducing a bias in a training of a machine learning model employed by the machine learning based analytical engine to reduce false negatives that are undesirable in water condition monitoring.

18. A system, comprising:
at least one Hybrid/Aerial Underwater Robotics System ("HAUCS") sensing platform comprising:
an Unmanned Aero-Amphibious Vehicle ("UAAV) configured to autonomously travel to a first location in proximity to a body of water by at least one of air, land and water in accordance with a pre-specified mission plan;
a mechanical device that is actuatable for transitioning at least one sensor from a retracted position in which the at least one sensor is adjacent to the UAAV to an extended position in which the at least one sensor resides a given distance from the UAAV, when the HAUCS sensing platform is at the first location;
the at least one sensor configured to collect first sensor data concerning a water condition of the body of water at a plurality of different depths while the HAUCS sensing platform is at the first location;
wherein the mechanical device is actuatable to transition the at least one sensor of the HAUCS sensing platform from the extended position to the retracted position after the first sensor data has been collected;
wherein the first sensor data is caused to be processed using a machine learning based analytical engine to determine whether a water distress condition exists or is predicted to occur in a given amount of time; and
wherein the pre-specified mission plan is modified to change at least one operating parameter of the HAUCS sensing platform when a determination is made that the water distress condition exists or is predicted to occur in a given amount of time.

19. The system according to claim 18, wherein the at least one operating parameter comprises a sampling or patrolling frequency.

20. The system according to claim 18, wherein:
the UAAV autonomously travels to a second location in proximity to the body of water by at least one of air, land and water in accordance with the pre-specified mission plan;
the mechanical device is actuated to transition the at least one sensor from the retracted position to the extended position, when the HAUCS sensing platform is at the second location;
the at least one sensor collects second sensor data concerning the water condition of the body of water at the plurality of different depths while the HAUCS sensing platform is at the second location; and
the mechanical device is actuated to transition the at least one sensor from the extended positon to the retracted position after the second sensor data has been collected.

21. The system according to claim 20, wherein the second sensor data is additionally used by the machine learning based analytical engine to determine whether the water distress condition exists or is predicted to occur in the given amount of time.

22. The system according to claim 18, wherein the UAAV performs autonomous operations to travel to a home station in accordance with the pre-specified mission plan.

23. The system according to claim 22, wherein the home station automatically cleans the at least one sensor when the HAUCS sensing platform is docked at the home station.

24. The system according to claim 22, wherein the home station automatically recharges a power source of the HAUCS sensing platform when the HAUCS sensing platform is docked at the home station.

25. The system according to claim 18, wherein the HAUCS sensing platform collects at least one of a water sample, a moribund animal, or a dead animal.

26. The system according to claim 18, wherein the UAAV takes at least one evasive action when a particular weather condition exists.

27. The system according to claim 18, wherein a vehicle mode of the UAAV is transitioned in view of a current weather condition from an aerial vehicle mode to an unmanned terrain vehicle mode, a sailing mode, a kite mode, or a submarine mode.

28. The system according to claim 18, wherein operations of at least one fixed instrument are controlled to improve the water condition of the body of water, when a determination is made that the water distress condition exists or is predicted to occur in a given amount of time.

29. The system according to claim 18, wherein the HAUCS sensing platform is caused to autonomously deploy a mobile instrument to the body of water when a determination is made that the water distress condition exists or is predicted to occur in a given amount of time.

30. The system according to claim 29, wherein operations of the mobile instrument are controlled to improve the water condition of the body of water once the mobile instrument has been deployed.

31. The system according to claim 18, wherein:
the machine learning based analytical engine and additional sensor data are used to determine whether the water distress condition no longer exists or is no longer predicted to occur; and
the pre-specified mission plan is modified to once again change the at least one operating parameter of the HAUCS sensing platform when a determination is made that the water distress condition no longer exists or is no longer predicted to occur.

32. The system according to claim 31, wherein operations of at least one fixed instrument are controlled to maintain the water condition of the body of water, when a determination is made that the water distress condition no longer exists or is no longer predicted to occur.

33. The system according to claim 31, wherein the HAUCS sensing platform is caused to autonomously retrieve a mobile instrument from the body of water when a determination is made that the water distress condition no longer exists or is no longer predicted to occur.

34. The system according to claim 18, wherein a bias is introduced in a training of a machine learning model employed by the machine learning based analytical engine to reduce false negatives that are undesirable in water condition monitoring.

* * * * *